(12) United States Patent
Xue et al.

(10) Patent No.: US 12,010,617 B2
(45) Date of Patent: Jun. 11, 2024

(54) TERMINAL DEVICE POWER SAVING METHOD AND APPARATUS, DEVICE, AND STORAGE MEDIUM

(71) Applicant: Huawei Technologies Co., Ltd., Shenzhen (CN)

(72) Inventors: Lixia Xue, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 474 days.

(21) Appl. No.: 17/306,333

(22) Filed: May 3, 2021

(65) Prior Publication Data
US 2021/0258875 A1 Aug. 19, 2021

Related U.S. Application Data

(63) Continuation of application No. PCT/CN2019/115078, filed on Nov. 1, 2019.

(30) Foreign Application Priority Data

Nov. 2, 2018 (CN) .......................... 201811301905.7

(51) Int. Cl.
*H04W 4/00* (2018.01)
*H04W 52/02* (2009.01)
*H04W 72/0446* (2023.01)

(52) U.S. Cl.
CPC ... *H04W 52/0212* (2013.01); *H04W 72/0446* (2013.01)

(58) Field of Classification Search
CPC ......... H04W 52/0212; H04W 72/0446; H04W 72/51; H04W 52/029; H04W 72/20; H04W 52/0229; H04W 52/0258; H04W 72/23
See application file for complete search history.

(56) References Cited

U.S. PATENT DOCUMENTS

2014/0321388 A1  10/2014 Jeong et al.
2017/0289900 A1  10/2017 Tchigevsky et al.
(Continued)

FOREIGN PATENT DOCUMENTS

CN   103428683 A   12/2013
CN   107430423 A   12/2017
(Continued)

OTHER PUBLICATIONS

Huawei, HiSilicon, "Power consumption reduction based on time/frequency/antenna adaptation," 3GPP TSG RAN WG1 Meeting #94bis, Chengdu, China, R1-1810154, total 5 pages, 3rd Generation Partnership Project, Valbonne, France (Oct. 8-12, 2018).
(Continued)

*Primary Examiner* — Omoniyi Obayanju
(74) *Attorney, Agent, or Firm* — Leydig, Voit & Mayer, Ltd.

(57) ABSTRACT

A power saving method includes: sending, by a terminal device, first information to a network device, where the first information is used to indicate processing time for the terminal device to process to-be-processed information; and configuring, by the network device, a time domain resource for the to-be-processed information based on the first information, and sending second information to the terminal device, where the second information is used to indicate the time domain resource. After receiving the second information, the terminal device adjusts the foregoing processing time based on the time domain resource indicated by the second information, to relax a clock of each module corresponding to the processing time. Thereby, a terminal device power saving is implemented. In addition, the network device configures the time domain resource based on the processing time of the terminal device that is indicated by the first information.

20 Claims, 19 Drawing Sheets

(56) References Cited

U.S. PATENT DOCUMENTS

2019/0320422 A1* 10/2019 Al-Imari ............... H04W 72/23
2019/0394075 A1* 12/2019 Baldemair .......... H04L 27/2621

FOREIGN PATENT DOCUMENTS

| CN | 108282286 A | 7/2018 |
|----|-------------|--------|
| WO | 2011038214 A1 | 3/2011 |
| WO | 2018031704 A1 | 2/2018 |

OTHER PUBLICATIONS

"3rd Generation Partnership Project; Technical Specification Group Radio Access Network; NR; Physical layer procedures for data (Release 15)," 3GPP TS 38.214 V15.2.0, total 94 pages, 3rd Generation Partnership Project, Valbonne, France (Jun. 2018).

Qualcomm Incorporated, "UE Power Saving during Active State," 3GPP TSG RAN WG2 NR #99bis, Prague, Czech, R2-1711904, total 9 pages, 3rd Generation Partnership Project, Valbonne, France (Oct. 9-13, 2017).

* cited by examiner

Time domain resource corresponding to processing time of a capability 1

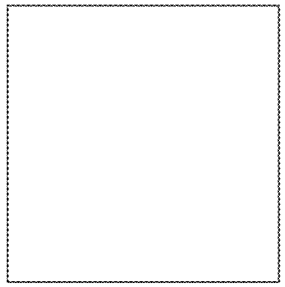

Time domain resource corresponding to processing time of a capability 2

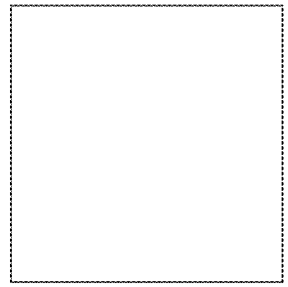

Time domain resource corresponding to processing time of a capability 3

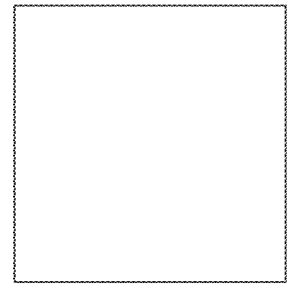

FIG. 5

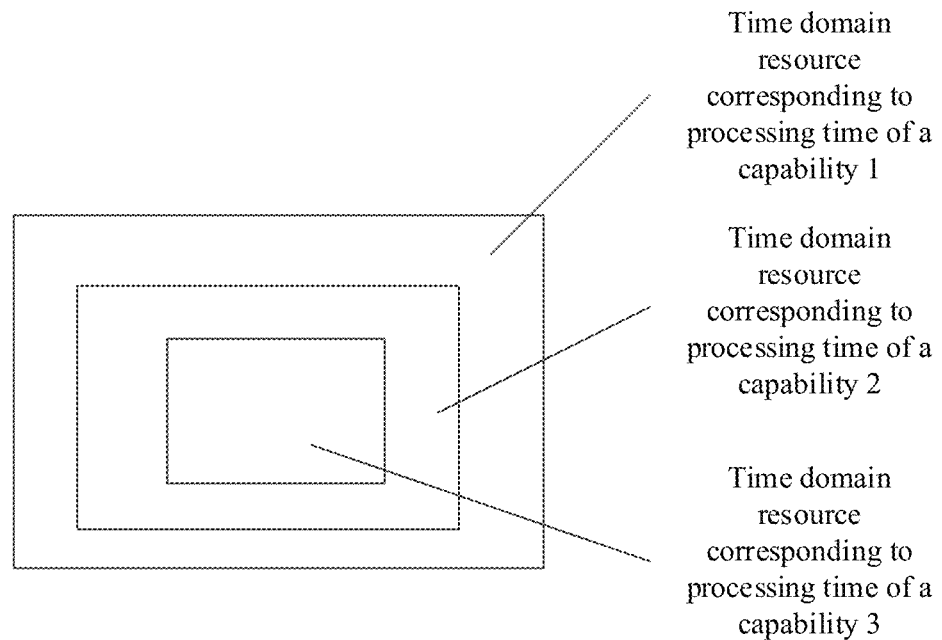

Time domain resource corresponding to processing time of a capability 1

Time domain resource corresponding to processing time of a capability 2

Time domain resource corresponding to processing time of a capability 3

FIG. 6

TERMINAL DEVICE POWER SAVING METHOD AND APPARATUS, DEVICE, AND STORAGE MEDIUM

CROSS-REFERENCE TO RELATED APPLICATIONS

This application is a continuation of International Application No. PCT/CN2019/115078, filed on Nov. 1, 2019, which claims priority to Chinese Patent Application No. 201811301905.7, filed on Nov. 2, 2018. The disclosures of the aforementioned applications are hereby incorporated by reference in their entireties.

FIELD

This application relates to the field of communications technologies, and in particular, to a terminal device power saving method and apparatus, and a storage medium.

BACKGROUND

Currently, terminal devices have increasingly more functions, and consume increasingly more power. This severely affects user experience. Therefore, standby time of a terminal device is used as an important indicator for a common user to select the terminal device. With development of 5th generation (5G) mobile communications system communications technologies, in the 5G new radio (NR) R15 standard, several types of processing time are defined for the terminal device, for example, physical downlink shared channel (PDSCH) processing time, channel state information (CSI) computation time, and physical uplink shared channel (PUSCH) preparation time. The foregoing processing time has great impact on power consumption of the terminal device.

In a current terminal device implementation technology, in a dynamic voltage and frequency scaling (DVFS), where the technology is also referred to as dynamic clock voltage scaling (DCVS) clock relaxation power saving mode, when a terminal device relies on scheduling by a network device to relax a clock of the terminal device to save power, there is a mismatch between the network device and the terminal device, and a balance cannot be achieved between effective power saving and time domain resource configuration flexibility. The PUSCH preparation time is used as an example. As shown in FIG. 2, capabilities that can be supported by the DVFS may include a capability 1, a capability 2, and a capability 3, and the capabilities correspond to different PUSCH preparation time. Processing speeds of the capability 1 to the capability 3 decrease successively, and increasingly more power is saved. If a PUSCH time domain resource configured by the network device for the terminal device is shown by a slashed part in FIG. 2, the terminal device can reduce a clock frequency to the capability 2 to save power, but cannot reduce the clock frequency to the most power-saving capability 3 (where the terminal device can reduce the clock frequency to the most power-saving capability 3 by sacrificing PUSCH time domain resource configuration flexibility a little more). However, if the terminal device reduces the clock frequency to the capability 2, the PUSCH time domain resource configuration flexibility marked by a bracket in FIG. 2 does not need to be sacrificed.

SUMMARY

Embodiments of this application provide a terminal device power saving method and apparatus, and a storage medium, so that a time domain resource configured by a network device is configured to be adapted to processing time of the terminal device, thereby minimizing sacrifice of time domain resource configuration flexibility while implementing terminal device power saving.

According to a first aspect, this application provides a terminal device power saving method, applied to a network device. The method includes: receiving first information from a terminal device, where the first information is used to indicate processing time for the terminal device to process to-be-processed information; configuring a time domain resource for the to-be-processed information based on the first information; and sending second information to the terminal device, where the second information is used to indicate the time domain resource.

Beneficial effects of this application include: the terminal device sends the processing time to the network device, so that the network device configures the time domain resource based on the processing time of the terminal device, thereby adapting the configured time domain resource to the processing time of the terminal device, and ensuring time domain resource configuration flexibility. In addition, the terminal device adjusts the processing time of the terminal device based on the time domain resource configured by the network device, to relax a clock of each module corresponding to the processing time, thereby implementing terminal device power saving.

Optionally, the first information includes a first capability corresponding to the processing time, and the configuring a time domain resource for the to-be-processed information based on the first information includes: determining, based on the first capability and a preset correspondence between different capabilities and different processing time, the processing time corresponding to the first capability; and configuring the time domain resource for the to-be-processed information based on the processing time.

Optionally, the first information includes the processing time, and the configuring a time domain resource for the to-be-processed information based on the first information includes: configuring the time domain resource for the to-be-processed information based on the processing time.

To be specific, the terminal device may report the first capability corresponding to the processing time to the network device, or may directly report the processing time, thereby enriching reporting manners.

Optionally, the second information includes the time domain resource and/or a capability corresponding to the time domain resource.

Optionally, the processing time includes N capabilities, and the configuring a time domain resource for the to-be-processed information based on the first information includes: configuring, based on the N capabilities of the processing time, time domain resources corresponding to M capabilities of the N capabilities, where N and M are positive integers greater than or equal to 1, and M is less than or equal to N; and determining, in the time domain resources corresponding to the M capabilities, a time domain resource corresponding to a second capability as the time domain resource configured for the to-be-processed information.

Optionally, the method according to this application further includes: receiving third information from the terminal device, where the third information is used to indicate processing time of a third capability, and the third capability is any capability other than the second capability in the N capabilities; using a time domain resource that is of the third capability and that corresponds to the processing time of the third capability as the time domain resource configured for the to-be-processed information; and sending fourth information to the terminal device, where the fourth information is used to indicate the time domain resource corresponding to the third capability. To be specific, when needing to change current processing time, the terminal device may send a request to the network device, so that the network device reconfigures a new time domain resource for the terminal device.

Optionally, the method according to this application further includes: determining, in the time domain resources corresponding to the M capabilities, a time domain resource corresponding to a fourth capability as the time domain resource configured for the to-be-processed information, where the fourth capability is any capability other than the second capability in the M capabilities; and sending fifth information to the terminal device, where the fifth information is used to indicate the time domain resource corresponding to the fourth capability. To be specific, when needing to change current processing time of the terminal device, the network device may send indication information to the terminal device, so that the terminal device adjusts the current processing time based on a time domain resource newly indicated by the network device.

Optionally, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

Optionally, the first information includes a clock relaxation factor and a clock relaxation correction parameter, and the configuring a time domain resource for the to-be-processed information based on the first information includes: configuring the time domain resource for the to-be-processed information based on the clock relaxation factor and the clock relaxation correction parameter. To be specific, in this application, in addition to reporting the processing time or a corresponding capability, the terminal device may further indirectly report the processing time by reporting the clock relaxation factor and the clock relaxation correction item, thereby further enriching the reporting manners of the processing time.

In some possible implementation scenarios, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

In a first scenario, when the to-be-processed information is a PDSCH, the processing time includes the PDCCH processing time and the PDSCH processing time.

In this case, the configuring a time domain resource for the to-be-processed information based on the first information may include: configuring a PDCCH time domain resource, a PDSCH time domain resource, and a hybrid automatic repeat request-acknowledgment (HARQ-ACK) time domain resource based on the PDCCH processing time and the PDSCH processing time.

A time interval between the last symbol of the PDCCH time domain resource and the first symbol of the PDSCH time domain resource is not less than the PDCCH processing time, and/or a time interval between the last symbol of the PDSCH time domain resource and the first symbol of the HARQ-ACK time domain resource is not less than the PDSCH processing time.

In a second scenario, when the to-be-processed information is periodic CSI, the processing time includes the first CSI computation time.

In this case, the configuring a time domain resource for the to-be-processed information based on the first information may include: configuring, based on the first CSI computation time, a time domain resource for carrying a periodic CSI-RS and a PUCCH time domain resource for carrying a CSI report, where a time interval between the last symbol of the time domain resource for carrying the periodic CSI-RS and the first symbol of the PUCCH time domain resource for carrying the CSI report is not less than the first CSI computation time.

In a third scenario, when the to-be-processed information is aperiodic CSI, the processing time includes: the PDCCH processing time, the PUSCH preparation time, the first CSI computation time, and the second CSI computation time.

In this case, the configuring a time domain resource for the to-be-processed information based on the first information may include: configuring, based on the first CSI computation time, the second CSI computation time, the PDCCH processing time, and the PUSCH preparation time, a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between preparation time and not less than the first CSI computation time, and/or a time interval between the last symbol of the time domain resource for carrying the PDCCH and the first symbol of the PUSCH time domain resource for carrying the CSI report is not less than the second CSI computation time.

In a fourth scenario, when the to-be-processed information is carried on PUSCH, the processing time includes the PUSCH preparation time.

In this case, the configuring a time domain resource for the to-be-processed information based on the first information may include: configuring a PDCCH time domain resource and a PUSCH time domain resource based on the PUSCH preparation time, where a time interval between the last symbol of the PDCCH time domain resource and the first symbol of the PUSCH time domain resource is not less than the PUSCH preparation time.

According to a second aspect, this application provides a terminal device power saving method, applied to a terminal device. The method may include: sending first information to a network device, where the first information is used to indicate processing time for the terminal device to process to-be-processed information; receiving second information from the network device, where the second information is used to indicate a time domain resource, and the time domain resource is determined based on the first information; and adjusting the processing time based on the time domain resource.

Optionally, the first information includes a first capability corresponding to the processing time.

Optionally, the first information includes the processing time.

Optionally, the second information includes the time domain resource and/or a capability corresponding to the time domain resource.

Optionally, the processing time includes N capabilities, the second information is used to indicate that the time domain resource is a time domain resource of a second capability in time domain resources corresponding to M capabilities, and the time domain resources corresponding to the M capabilities are time domain resources configured by the network device for the M capabilities of the N capabilities, where N and M are positive integers greater than or equal to 1, and M is less than or equal to N.

Optionally, the method according to this application further includes: sending third information to the network device, where the third information is used to indicate processing time of a third capability, and the third capability is any capability other than the second capability in the N capabilities; receiving fourth information from the network device, where the fourth information is used to indicate a time domain resource corresponding to the third capability; and adjusting the processing time based on the time domain resource corresponding to the third capability.

Optionally, the method according to this application further includes: receiving fifth information from the network device, where the fifth information is used to indicate a time domain resource corresponding to a fourth capability, and the time domain resource corresponding to the fourth capability is a time domain resource corresponding to any capability other than the second capability in the M capabilities; and adjusting the processing time based on the time domain resource corresponding to the fourth capability.

Optionally, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

Optionally, the first information includes a clock relaxation factor and a clock relaxation correction parameter.

In some possible implementation scenarios, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

In a first scenario, when the to-be-processed information is a PDSCH, the processing time includes the PDCCH processing time and the PDSCH processing time.

Correspondingly, the second information is used to indicate a PDCCH time domain resource, a PDSCH time domain resource, and a hybrid automatic repeat request-acknowledgment (HARQ-ACK) time domain resource.

A time interval between the last symbol of the PDCCH time domain resource and the first symbol of the PDSCH time domain resource is not less than the PDCCH processing time.

In this scenario, the adjusting the processing time based on the time domain resource includes: adjusting the PDSCH processing time based on the time interval between the last symbol of the PDSCH time domain resource and the first symbol of the HARQ-ACK time domain resource; and/or adjusting the PDCCH processing time based on the time interval between the last symbol of the PDCCH time domain resource and the first symbol of the PDSCH time domain resource.

Optionally, in this scenario, the following manner may be used to save power: disabling a downlink data receiving module of the terminal device within the PDCCH processing time, where the downlink data receiving module includes a front-end receiving unit, such as a radio frequency unit, for receiving downlink data and/or a buffer unit for buffering downlink data.

In a second scenario, when the to-be-processed information is periodic CSI, the processing time includes the first CSI computation time.

Correspondingly, the second information is used to indicate a time domain resource for carrying a periodic CSI-RS and a PUCCH time domain resource for carrying a CSI report, and a time interval between the last symbol of the time domain resource for carrying the periodic CSI-RS and the first symbol of the PUCCH time domain resource for carrying the CSI report is not less than the first CSI computation time.

In this scenario, the adjusting the processing time based on the time domain resource may include: adjusting the first CSI computation time based on the time interval between the last symbol of the time domain resource for carrying the periodic CSI-RS and the first symbol of the PUCCH time domain resource for carrying the CSI report.

In a third scenario, when the to-be-processed information is aperiodic CSI, the processing time includes: the PDCCH processing time, the PUSCH preparation time, the first CSI computation time, and the second CSI computation time.

Correspondingly, the second information is used to indicate a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between preparation time and not less than the first CSI computation time, and/or a time interval between the last symbol of the time domain resource for carrying the PDCCH and the first symbol of the PUSCH time domain resource for carrying the CSI report is not less than the second CSI computation time.

In this scenario, the adjusting the processing time based on the time domain resource may include: adjusting the PDCCH processing time based on the time interval between the last symbol of the PDCCH time domain resource for triggering the aperiodic CSI report and the first symbol of the time domain resource for carrying the aperiodic CSI-RS; and/or adjusting the first CSI computation time and/or the PUSCH preparation time based on the time interval between the last symbol of the time domain resource for carrying the aperiodic CSI-RS and the first symbol of the PUSCH time domain resource for carrying the CSI report; and/or adjusting the second CSI computation time and/or the PUSCH preparation time based on the time interval between the last symbol of the PDCCH time domain resource for triggering the aperiodic CSI report and the first symbol of the PUSCH time domain resource for carrying the CSI report.

Optionally, in this scenario, the following manner may be used to save power: disabling a downlink data receiving module of the terminal device within the PDCCH processing time, where the downlink data receiving module includes a front-end receiving unit, such as a radio frequency unit, for receiving downlink data and/or a buffer unit for buffering downlink data.

In a fourth scenario, when the to-be-processed information is a PUSCH, the processing time includes the PUSCH preparation time.

Correspondingly, the second information is used to indicate a PDCCH time domain resource and a PUSCH time domain resource, where a time interval between the last symbol of the PDCCH time domain resource and the first symbol of the PUSCH time domain resource is not greater than the PUSCH preparation time.

In this scenario, the adjusting the processing time based on the time domain resource may include: adjusting the PUSCH preparation time based on the time interval between the last symbol of the PDCCH time domain resource and the first symbol of the PUSCH time domain resource.

According to a third aspect, this application provides a power saving apparatus, used in a network device. The apparatus includes:

- a receiving unit, configured to receive first information from a terminal device, where the first information is used to indicate processing time for the terminal device to process to-be-processed information;
- a processing unit, configured to configure a time domain resource for the to-be-processed information based on the first information; and
- a sending unit, configured to send second information to the terminal device, where the second information is used to indicate the time domain resource.

Optionally, the first information includes a first capability corresponding to the processing time. Correspondingly, the processing unit is specifically configured to: determine, based on the first capability and a preset correspondence between different capabilities and different processing time, the processing time corresponding to the first capability; and configure the time domain resource for the to-be-processed information based on the processing time.

Optionally, the processing unit is specifically configured to configure the time domain resource for the to-be-processed information based on the processing time.

Optionally, the second information includes the time domain resource and/or a capability corresponding to the time domain resource.

Optionally, the processing time includes N capabilities. Correspondingly, the processing unit is specifically configured to: configure, based on the N capabilities of the processing time, time domain resources corresponding to M capabilities of the N capabilities, where N and M are positive integers greater than or equal to 1, and M is less than or equal to N; and determine, in the time domain resources corresponding to the M capabilities, a time domain resource corresponding to a second capability as the time domain resource configured for the to-be-processed information.

Optionally, the receiving unit is further configured to receive third information from the terminal device, where the third information is used to indicate processing time of a third capability, and the third capability is any capability other than the second capability in the N capabilities.

The processing unit is further configured to use a time domain resource that is of the third capability and that corresponds to the processing time of the third capability as the time domain resource configured for the to-be-processed information.

The sending unit is further configured to send fourth information to the terminal device, where the fourth information is used to indicate the time domain resource corresponding to the third capability.

Optionally, the processing unit is further configured to determine, in the time domain resources corresponding to the M capabilities, a time domain resource corresponding to a fourth capability as the time domain resource configured for the to-be-processed information, where the fourth capability is any capability other than the second capability in the M capabilities.

The sending unit is further configured to send fifth information to the terminal device, where the fifth information is used to indicate the time domain resource corresponding to the fourth capability.

Optionally, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

Optionally, the first information includes a clock relaxation factor and a clock relaxation correction parameter. Correspondingly, the processing unit is configured to configure the time domain resource for the to-be-processed information based on the clock relaxation factor and the clock relaxation correction parameter.

Optionally, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

Optionally, when the to-be-processed information is a PDSCH, the processing time includes the PDCCH processing time and the PDSCH processing time.

Correspondingly, the processing unit is specifically configured to configure a PDCCH time domain resource, a PDSCH time domain resource, and a hybrid automatic repeat request-acknowledgment (HARQ-ACK) time domain resource based on the PDCCH processing time and the PDSCH processing time.

A time interval between the last symbol of the PDCCH time domain resource and the first symbol of the PDSCH time domain resource is not less than the PDCCH processing time.

Optionally, when the to-be-processed information is periodic CSI, the processing time includes the first CSI computation time.

Correspondingly, the processing unit is specifically configured to configure, based on the first CSI computation time, a time domain resource for carrying a periodic CSI-RS and a PUCCH time domain resource for carrying a CSI report, where a time interval between the last symbol of the time domain resource for carrying the periodic CSI-RS and the first symbol of the PUCCH time domain resource for carrying the CSI report is not less than the first CSI computation time.

Optionally, when the to-be-processed information is aperiodic CSI, the processing time includes: the PDCCH processing time, the PUSCH preparation time, the first CSI computation time, and the second CSI computation time.

Correspondingly, the processing unit is specifically configured to configure, based on the first CSI computation time, the second CSI computation time, the PDCCH processing time, and the PUSCH preparation time, a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between the last symbol of the time domain resource for carrying the aperiodic CSI-RS and the first symbol of the PUSCH time domain resource for carrying the CSI report is not less than the PUSCH preparation time and not less than the first CSI computation time, and/or a time interval between the last symbol of the time domain resource for carrying the PDCCH and the first symbol of the PUSCH time domain resource for carrying the CSI report is not less than the second CSI computation time.

Optionally, when the to-be-processed information is carried on PUSCH, the processing time includes the PUSCH preparation time.

Correspondingly, the processing unit is specifically configured to configure a PDCCH time domain resource and a PUSCH time domain resource based on the PUSCH preparation time, where a time interval between the last symbol of the PDCCH time domain resource and the first symbol of the PUSCH time domain resource is not less than the PUSCH preparation time.

According to a fourth aspect, this application provides a power saving apparatus, used in a terminal device. The apparatus includes:

a sending unit, configured to send first information to a network device, where the first information is used to indicate processing time for the terminal device to process to-be-processed information;

a receiving unit, configured to receive second information from the network device, where the second information is used to indicate a time domain resource, and the time domain resource is determined based on the first information; and a processing unit, configured to adjust the processing time based on the time domain resource.

Optionally, the first information includes a first capability corresponding to the processing time.

Optionally, the first information includes the processing time.

Optionally, the second information includes the time domain resource and/or a capability corresponding to the time domain resource.

Optionally, the processing time includes N capabilities, the second information is used to indicate that the time domain resource is a time domain resource of a second capability in time domain resources corresponding to M capabilities, and the time domain resources corresponding to the M capabilities are time domain resources configured by the network device for the M capabilities of the N capabilities, where N and M are positive integers greater than or equal to 1, and M is less than or equal to N.

Optionally, the sending unit is further configured to send third information to the network device, where the third information is used to indicate processing time of a third capability, and the third capability is any capability other than the second capability in the N capabilities.

The receiving unit is further configured to receive fourth information from the network device, where the fourth information is used to indicate a time domain resource corresponding to the third capability.

The processing unit is further configured to adjust the processing time based on the time domain resource corresponding to the third capability.

Optionally, the receiving unit is further configured to receive fifth information from the network device, where the fifth information is used to indicate a time domain resource corresponding to a fourth capability, and the time domain resource corresponding to the fourth capability is a time domain resource corresponding to any capability other than the second capability in the M capabilities.

The processing unit is further configured to adjust the processing time based on the time domain resource corresponding to the fourth capability.

Optionally, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

Optionally, the first information includes a clock relaxation factor and a clock relaxation correction parameter.

Optionally, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

Optionally, when the to-be-processed information is a PDSCH, the processing time includes the PDCCH processing time and the PDSCH processing time.

Correspondingly, the second information is used to indicate a PDCCH time domain resource, a PDSCH time domain resource, and a hybrid automatic repeat request-acknowledgment (HARQ-ACK) time domain resource.

A time interval between the last symbol of the PDCCH time domain resource and the first symbol of the PDSCH time domain resource is not less than the PDCCH processing time, and/or a time interval between the last symbol of the PDSCH time domain resource and the first symbol of the HARQ-ACK time domain resource is not less than the PDSCH processing time.

Optionally, the processing unit is specifically configured to: adjust the PDSCH processing time based on the time interval between the last symbol of the PDSCH time domain resource and the first symbol of the HARQ-ACK time domain resource; and/or adjust the PDCCH processing time based on the time interval between the last symbol of the PDCCH time domain resource and the first symbol of the PDSCH time domain resource. Optionally, the processing unit is further configured to disable a downlink data receiving module of the terminal device within the PDCCH processing time, where the downlink data receiving module includes a front-end receiving unit, such as a radio frequency unit, for receiving downlink data and/or a buffer unit for buffering downlink data.

Optionally, when the to-be-processed information is periodic CSI, the processing time includes the first CSI computation time.

Correspondingly, the second information is used to indicate a time domain resource for carrying a periodic CSI-RS and a PUCCH time domain resource for carrying a CSI report, and a time interval between the last symbol of the time domain resource for carrying the periodic CSI-RS and the first symbol of the PUCCH time domain resource for carrying the CSI report is not less than the first CSI computation time.

Optionally, the processing unit is specifically configured to adjust the first CSI computation time based on the time interval between the last symbol of the time domain resource for carrying the periodic CSI-RS and the first symbol of the PUCCH time domain resource for carrying the CSI report.

Optionally, when the to-be-processed information is aperiodic CSI, the processing time includes: the PDCCH processing time, the PUSCH preparation time, the first CSI computation time, and the second CSI computation time.

Correspondingly, the second information is used to indicate a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between the last symbol of the time domain resource for carrying the aperiodic CSI-RS and the first symbol of the PUSCH time domain resource for carrying the CSI report is not less than the PUSCH preparation time and not less than the first CSI computation time, and/or a time interval between the last symbol of the time domain resource for carrying the PDCCH and the first symbol of the PUSCH time domain resource for carrying the CSI report is not less than the second CSI computation time.

Optionally, the processing unit is specifically configured to adjust the PDCCH processing time based on the time interval between the last symbol of the PDCCH time domain resource for triggering the aperiodic CSI report and the first symbol of the time domain resource for carrying the aperiodic CSI-RS; and/or adjust the first CSI computation time and/or the PUSCH preparation time based on the time interval between the last symbol of the time domain resource for carrying the aperiodic CSI-RS and the first symbol of the PUSCH time domain resource for carrying the CSI report; and/or adjust the second CSI computation time and/or the PUSCH preparation time based on the time interval between the last symbol of the PDCCH time domain resource for triggering the aperiodic CSI report and the first symbol of the PUSCH time domain resource for carrying the CSI report.

Optionally, the processing unit is further configured to disable a downlink data receiving module of the terminal device within the PDCCH processing time, where the downlink data receiving module includes a front-end receiving unit, such as a radio frequency unit, for receiving downlink data and/or a buffer unit for buffering downlink data.

Optionally, when the to-be-processed information is a PUSCH, the processing time includes the PUSCH preparation time.

Correspondingly, the second information is used to indicate a PDCCH time domain resource and a PUSCH time domain resource, where a time interval between the last symbol of the PDCCH time domain resource and the first symbol of the PUSCH time domain resource is not greater than the PUSCH preparation time.

Optionally, the processing unit is specifically configured to adjust the PUSCH preparation time based on the time interval between the last symbol of the PDCCH time domain resource and the first symbol of the PUSCH time domain resource.

According to a fifth aspect, an embodiment of this application provides a communications device. The communications device includes a processor and a transceiver. The processor and the transceiver are configured to perform the terminal device power saving method according to any one of the first aspect or the second aspect.

According to a sixth aspect, an embodiment of this application provides an apparatus. The apparatus exists in a product form of a chip. A structure of the apparatus includes a processor and a memory. The memory is configured to: be coupled to the processor, and store program instructions and data for the apparatus. The processor is configured to execute the program instructions stored in the memory, so that the apparatus performs functions of the terminal device in the foregoing methods.

According to a seventh aspect, an embodiment of this application provides a terminal device. The terminal device may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device includes a processor and a transceiver. The processor is configured to support the terminal device in performing corresponding functions in the foregoing methods. The transceiver is configured to support communication between the terminal device and another terminal device or a network device. The terminal device may further include a memory. The memory is configured to: be coupled to the processor, and store program instructions and data for the terminal device.

According to an eighth aspect, an embodiment of this application provides an apparatus. The apparatus exists in a product form of a chip. A structure of the apparatus includes a processor and a memory. The memory is configured to: be coupled to the processor, and store program instructions and data for the apparatus. The processor is configured to execute the program instructions stored in the memory, so that the apparatus performs functions of the network device in the foregoing methods.

According to a ninth aspect, an embodiment of this application provides a network device. The network device may implement functions performed by the network device in the foregoing method embodiments. The functions may be implemented by hardware, or may be implemented by hardware by executing corresponding software. The hardware or software includes one or more modules or units corresponding to the foregoing functions.

In a possible design, a structure of the network device includes a processor and a communications interface. The processor is configured to support the network device in performing corresponding functions in the foregoing methods. The communications interface is configured to support communication between the network device and another network element. The network device may further include a memory. The memory is configured to be coupled to the processor, and stores program instructions and data for the network device.

According to a tenth aspect, an embodiment of this application provides a computer storage medium, where the storage medium includes computer instructions; and when the instructions are executed by a computer, the computer is enabled to implement the terminal device power saving method according to any one of the first aspect and the second aspect.

According to an eleventh aspect, an embodiment of this application provides a computer program product, where the program product includes a computer program, the computer program is stored in a readable storage medium, at least one processor of a communications apparatus may read the computer program from the readable storage medium, and the at least one processor executes the computer program to enable the communications apparatus to implement the terminal device power saving method according to any one of the first aspect or the second aspect.

According to a twelfth aspect, an embodiment of this application provides a communications system, where the system includes the foregoing terminal device and network device.

According to the terminal device power saving method and apparatus, the device, and the storage medium provided in the embodiments of this application, the terminal device sends the first information to the network device, where the first information is used to indicate the processing time for the terminal device to process the to-be-processed information; and the network device configures the time domain resource for the to-be-processed information based on the first information, and sends the second information to the terminal device, where the second information is used to indicate the time domain resource. After receiving the second information, the terminal device adjusts the foregoing processing time based on the time domain resource indicated by the second information, to relax the clock of each module corresponding to the processing time, thereby implementing the terminal device power saving. In addition, the network device configures the time domain resource based on the processing time of the terminal device, so that the configured time domain resource is adapted to the corresponding processing time, thereby ensuring time domain resource configuration flexibility.

BRIEF DESCRIPTION OF DRAWINGS

FIG. 5 is a schematic configuration diagram of a time domain resource according to an embodiment of this application;

FIG. 6 is another schematic configuration diagram of a time domain resource according to an embodiment of this application;

DETAILED DESCRIPTION

Figure 1:
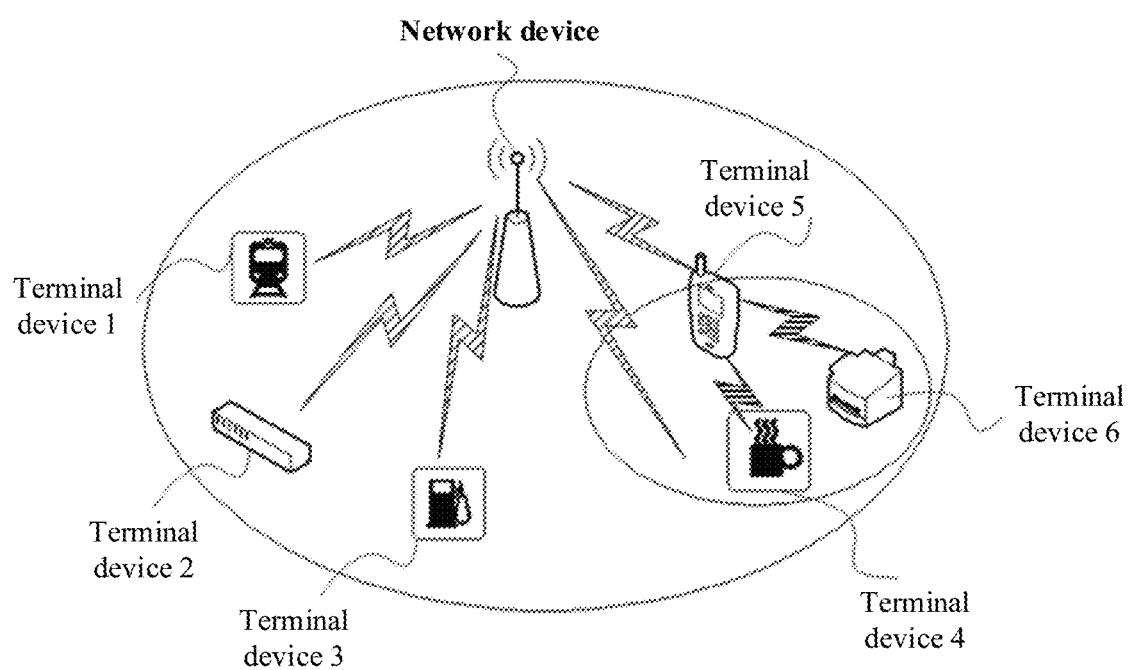
FIG. 1 is a schematic diagram of a communications system according to an embodiment of this application.

FIG. 1 is a schematic diagram of a communications system according to an embodiment of this application. As shown in FIG. 1, the communications system includes a network device and a terminal device.

The following explains and describes some terms in this application, to help a person skilled in the art have an understanding.

A network device is a device, for example, a radio access network (RAN) node, in a wireless network that enables a terminal to access the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), and a wireless fidelity (Wi-Fi) access point (AP). In a network structure, the network device may include a centralized unit (CU) node, a distributed unit (DU) node, or a RAN device including a CU node and a DU node. This is not limited herein.

A terminal device may be a wireless terminal device or a wired terminal device. The wireless terminal device may be a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be a mobile phone, a tablet (Pad), a computer having a wireless transceiver function, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, a wireless terminal device in a smart home, or the like. This is not limited herein. It may be understood that, in the embodiments of this application, the terminal device may also be referred to as user equipment (UE).

The technical solutions described in the embodiments of this application may be applied to a plurality of communications systems, including a 2G, 3G, 4G, or 5G communications system, or a next generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency division multiple access (OFDMA) system, a single carrier FDMA (SC-FDMA) system, a general packet radio service (GPRS) system, a long term evolution (LTE) system, and a new radio (NR) communications system.

In the embodiments of this application, a time domain resource may be used to carry control signaling or data in a process of communication between the terminal device and the network device. The time domain resource may include one or more continuous transmission time intervals (TTI), one or more continuous slots, or one or more continuous time domain symbols. The slot may be a full slot, or may be a mini-slot (or referred to as a non-slot). Different time domain resources are used to carry different data packets or different duplicates (or referred to as duplicate versions) of a same data packet.

The following describes the technical solutions in the embodiments of this application with reference to the accompanying drawings in the embodiments of this application. In descriptions of this application, unless otherwise specified, "a plurality of" refers to two or more than two.

In addition, to clearly describe the technical solutions in the embodiments of this application, terms such as "first" and "second" are used in the embodiments of this application to distinguish between same items or similar items that have basically same functions and purposes. A person skilled in the art may understand that terms such as "first" and "second" do not limit a quantity or an execution sequence, and terms such as "first" and "second" do not indicate a definite difference.

Figure 3:
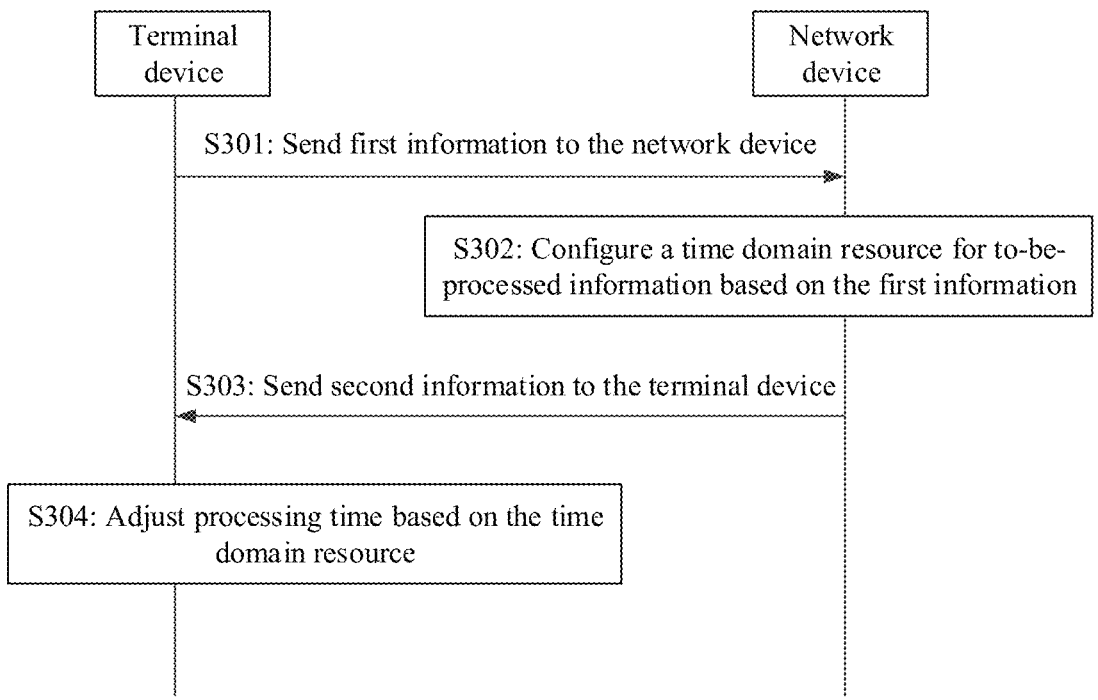
FIG. 3 is a schematic flowchart of a terminal device power saving method according to a first embodiment of this application.

FIG. 3 is a schematic flowchart of a terminal device power saving method according to a first embodiment of this application. As shown in FIG. 3, the method in this embodiment may include the following steps.

At S301, a terminal device sends first information to a network device.

The first information is used to indicate processing time for the terminal device to process to-be-processed information.

At S302, the network device configures a time domain resource for the to-be-processed information based on the first information.

At S303, the network device sends second information to the terminal device.

The second information is used to indicate the time domain resource.

At S304, the terminal device adjusts the processing time based on the time domain resource.

The processing time in this embodiment of this application includes but is not limited to physical downlink control channel (PDCCH) processing time, PDSCH processing time, first CSI computation time, second CSI computation time, PUSCH preparation time, and the like.

In the existing NR R15, the PDSCH processing time, the first CSI computation time, the second CSI computation time, and the PUSCH preparation time are defined for the terminal device. Scheduling of a corresponding time domain resource by the network device needs to meet a corresponding timeline requirement. For example, when the network device schedules a PUSCH time domain resource for a terminal device by using a PDCCH, a time interval between the first symbol of the PUSCH time domain resource scheduled by the network device and the last symbol of the PDCCH for scheduling the PUSCH time domain resource cannot be less than the PUSCH preparation time of the terminal device.

Power of a system on a chip (SoC) of the terminal device meets a formula (1):

$$P=v^2*f*c \qquad (1)$$

c is a capacitance related to an implementation of an SoC electronic circuit, and is a constant.

It can be learned from the foregoing formula (1) that the power P is directly proportional to a square of the voltage v and is directly proportional to the clock frequency f. To be specific, terminal device power saving can be implemented by reducing the voltage and/or the clock frequency. If the clock frequency is reduced, correspondingly, a processing speed of a baseband chip of the terminal device is reduced, and processing time used by the terminal device to process to-be-processed information is increased. It can be learned that a length of the processing time used by the terminal device to process the to-be-processed information greatly affects power consumption of the terminal device.

Figure 2:
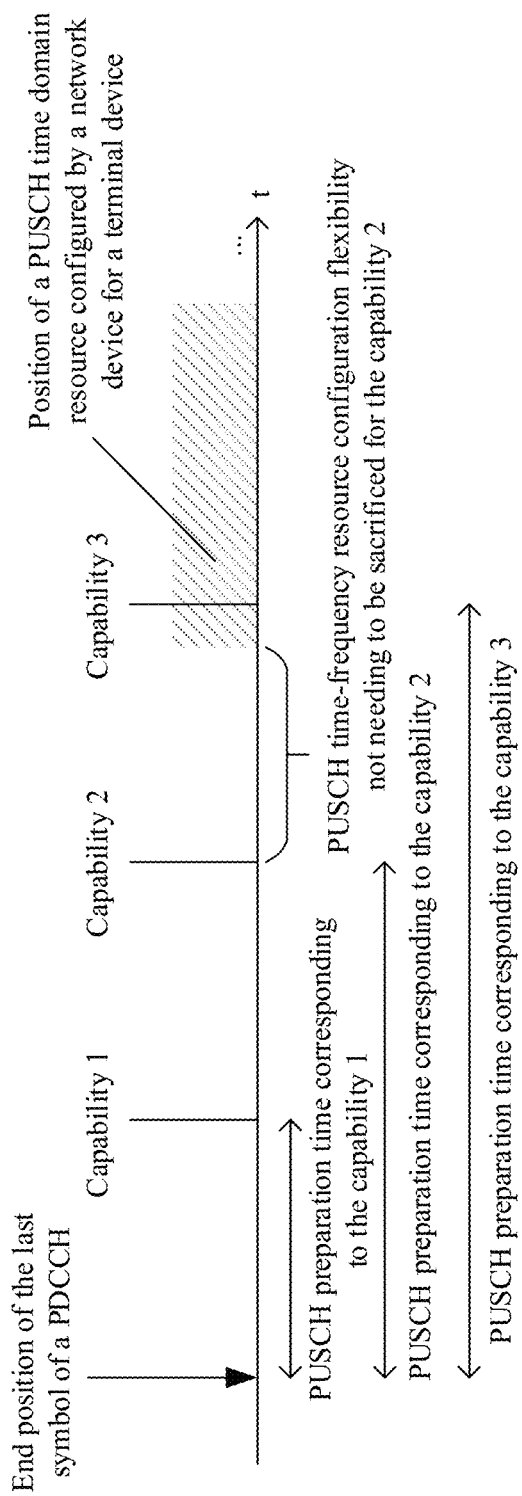
FIG. 2 is an existing schematic diagram of a relationship between a PUSCH time domain resource scheduled by a network device and PUSCH preparation time of a terminal device.

However, when the clock frequency of the terminal device is reduced, the terminal device cannot meet the foregoing timeline requirement. For example, as shown in FIG. 2, the PUSCH preparation time of the terminal device includes three capabilities. Processing speeds corresponding to a capability 1, a capability 2, and a capability 3 decrease successively, and the terminal device saves increasingly more power. When a position of the PUSCH time domain resource configured by the network device for the terminal device is shown by slashes in the figure, that is, the first symbol of the PUSCH time domain resource is within PUSCH preparation time of the capability 3, the terminal device can process the to-be-processed information within PUSCH preparation time of the capability 2, but cannot process the to-be-processed information within the PUSCH preparation time of the most power-saving capability 3. In this case, as shown in FIG. 2, most time domain resources between the last symbol of the PUSCH preparation time of the capability 2 and the first symbol of the configured PUSCH time domain resource cannot be configured as PUSCH time domain resources. Consequently, PUSCH time domain resource configuration flexibility is reduced. It can be learned that, in the conventional technology, power saved in the terminal device cannot be maximized by sacrificing time domain resource configuration flexibility to some extent. Alternatively, equivalently, in the conventional technology, sacrifice of time domain resource configuration flexibility cannot be minimized when power is saved in the terminal device. Simply speaking, in the conventional technology, because the network device cannot learn of processing time of the terminal device in a power saving state, time domain resource configuration of the network device is not adapted to the processing time of the terminal device.

To resolve the foregoing technical problem, in this embodiment of this application, when the terminal device needs to save power under a specific condition, for example, an amount of electricity of the terminal device is less than a threshold, the terminal device sends the first information to the network device, where the first information indicates the processing time for the terminal device to process the to-be-processed information. The network device configures the time domain resource for the to-be-processed information based on the processing time indicated by the first information, so that the configured time domain resource is adapted to the processing time of the terminal device. That the processing time of the terminal device is adapted to the time domain resource may be understood as follows: for the PDSCH processing time, a time interval between the first symbol of a HARQ-ACK time domain resource scheduled by the network device and the last symbol of a PDSCH time domain resource is not less than the PDSCH processing time of the terminal device. For the PUSCH preparation time, a time interval between the first symbol of a PUSCH time domain resource scheduled by the network device and the last symbol of a PDCCH for scheduling the PUSCH time domain resource is not less than the PUSCH preparation time of the terminal device. For the first CSI computation time, a time interval between the last symbol of an uplink channel resource (for example, a PUCCH or a PUSCH) that is scheduled by the network device and that is used to report a CSI report and the first symbol of the PUCCH for carrying the CSI report is not less than the first CSI computation time of the terminal device. Then, the network device sends the second information to the terminal device, where the second information indicates the time domain resource configured by the network device based on the processing time. After receiving the second information, the terminal device parses the second information to obtain the time domain resource indicated by the second information, and adjusts the processing time of the terminal device based on the time domain resource.

Figure 4:
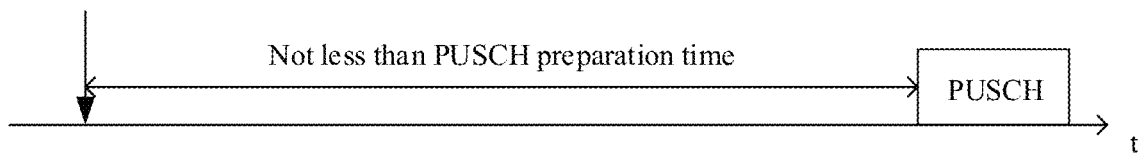
FIG. 4 is a schematic diagram of a relationship between a PUSCH time domain resource and PUSCH preparation time of a terminal device according to an embodiment of this application.

In this embodiment of this application, the network device configures the time domain resource based on the processing time indicated by the first information sent by the terminal device, so that the terminal device adjusts the processing time based on the configured time domain resource, to adaptively relax a clock of a corresponding module, thereby implementing terminal device power saving. As shown in FIG. 4, a PUSCH is used as an example. The network device configures a PDCCH time domain resource and a PUSCH time domain resource based on the PUSCH preparation time indicated by the terminal device, where a time interval between the last symbol of the PDCCH time domain resource and the first symbol of the PUSCH time domain resource is not less than the PUSCH preparation time. In this way, the terminal device can adjust the PUSCH preparation time based on the time interval between the last symbol of the PDCCH time domain resource configured by the network device and the first symbol of the PUSCH time domain resource, to adaptively relax a clock of a PUSCH module, thereby implementing terminal device power saving.

In addition, the network device configures the time domain resource based on the processing time of the terminal device, so that the configured time domain resource is adapted to the corresponding processing time, thereby ensuring time domain resource configuration flexibility.

For example, the processing time indicated by the first information may be one or more processing time durations. A PUSCH is used as an example, and the processing time may include PDCCH processing time and PUSCH preparation time. Periodic CSI is used as an example, and the processing time may include first CSI computation time, where the first CSI computation time is time from a CSI-RS to an uplink channel resource of a CSI report.

For example, as shown in FIG. 2, the processing time includes a plurality of capabilities, and the first information may indicate processing time of one capability. For example, the first information indicates the PUSCH preparation time of the capability 3. Optionally, the first information may indicate processing time of a plurality of capabilities. For example, the first information indicates PUSCH preparation time of the capability 1, the PUSCH preparation time of the capability 2, and the PUSCH preparation time of the capability 3.

For example, the processing time indicated by the first information may be processing time of one piece of to-be-processed information. For example, the processing time indicated by the first information is processing time corresponding to a PUSCH, or is processing time corresponding to aperiodic CSI. Optionally, the processing time indicated by the first information may alternatively be processing time of a plurality of pieces of to-be-processed information. For example, the processing time indicated by the first information is processing time corresponding to a PUSCH and processing time corresponding to aperiodic CSI. This embodiment of this application is described by using an example in which the processing time indicated by the first information is processing time of one piece of to-be-processed information. When the processing time indicated by the first information is processing time of a plurality of pieces of to-be-processed information, an execution process corresponding to each piece of to-be-processed information is the same as an execution process corresponding to one piece of to-be-processed information, and reference may be made thereto.

Optionally, in this embodiment of this application, in addition to sending the first information to the network device when a quantity of electricity of the terminal device is less than a threshold, the terminal device may further send the first information to the network device when an operating temperature is greater than a threshold.

Optionally, the terminal device may further send the first information to the network device under another condition. This is not limited in this embodiment of this application. For example, the terminal device receives indication information sent by the network device, where the indication information is used to indicate the terminal device to send the first information to the network device.

Optionally, the first information may be a radio resource control (RRC) message, or media access control control element (MAC CE) or physical layer signaling.

According to the terminal device power saving method provided in this embodiment of this application, the terminal device sends the first information to the network device, where the first information is used to indicate the processing time for the terminal device to process the to-be-processed information; and the network device configures the time domain resource for the to-be-processed information based on the first information, and sends the second information to the terminal device, where the second information is used to indicate the time domain resource. After receiving the second information, the terminal device adjusts the foregoing processing time based on the time domain resource indicated by the second information, to relax a clock of each module corresponding to the processing time, thereby implementing terminal device power saving. In addition, the network device configures the time domain resource based on the processing time of the terminal device, so that the configured time domain resource is adapted to the corresponding processing time, thereby ensuring time domain resource configuration flexibility.

In this embodiment of this application, the network device configures the time domain resource for the terminal device in an explicit or implicit configuration manner.

In the explicit configuration manner, the network device determines, based on a capability or processing time reported by the terminal device, a capability or processing time to be configured for the terminal device, and sends a configuration of the capability or processing time and a configuration of a time domain resource corresponding to the capability or processing time to the terminal device. There may be one or more capability or processing time configurations sent by the network device to the terminal device, and there may be one or more sets of time domain resource configurations. Different capabilities correspond to different processing time. Processing time of one or more capabilities corresponds to one set of time domain resources configured by the network device. In this way, after the network device sends a capability to the terminal device, the terminal device can obtain processing time and a time domain resource that correspond to the capability.

In the implicit configuration manner, the network device configures a set of time domain resources for the terminal device based on a capability or processing time reported by the terminal device, where each time domain resource in the set of time domain resources meets corresponding processing time. The terminal device may implicitly learn, based on a time domain resource that is in the set of time domain resources and that meets specific processing time or processing time corresponding to a specific capability, of a capability or processing time configured by the network device for the terminal device.

In an example, when the terminal device reports a number of a capability, the network device may obtain processing time corresponding to the number of the capability. As shown in FIG. 5, the network device configures a plurality of sets of time domain resources for the terminal device, and each set of time domain resources includes processing time corresponding to the set of time domain resources and a capability of the processing time. As shown in FIG. 5, the processing time includes three capabilities. The network device configures a corresponding time domain resource for processing time of each capability, to form three sets of time domain resources, where processing time of a capability 1 corresponds to a time domain resource 1, processing time of a capability 2 corresponds to a time domain resource 2, and processing time of a capability 3 corresponds to a time domain resource 3.

In another example, as shown in FIG. 6, the network device configures a set of time domain resources for the terminal device, where the set of time domain resources includes time domain resources corresponding to processing time of a plurality of capabilities, and a time domain resource corresponding to processing time of each capability is a subset of the set of time domain resources.

It is assumed that the processing time includes M capabilities, where a time domain resource of a latter capability in two adjacent capabilities of the M capabilities is included in a time domain resource of a former capability, or a time domain resource of a latter capability of two adjacent capabilities in the M capabilities includes a time domain resource of a former capability.

For example, as shown in FIG. 6, M is 3, a time domain resource corresponding to processing time of a capability 3 is included in a time domain resource corresponding to processing time of a capability 2, and the time domain resource corresponding to the processing time of the capability 2 is included in a time domain resource corresponding to processing time of a capability 1. The processing time of the capability 1 is less than the processing time of the capability 2, and the processing time of the capability 2 is less than the processing time of the capability 3.

It can be learned from the foregoing that, in this embodiment of this application, the second information sent by the network device to the terminal device may include the time domain resource and/or the capability corresponding to the time domain resource, that is, the second information may include the time domain resource and/or the capability.

In this embodiment of this application, a manner in which the first information indicates the processing time includes but is not limited to the following examples.

In a first example, the first information in this embodiment of this application may include a capability corresponding to the processing time, for example, a first capability. In this case, that the network device configures a time domain resource for the to-be-processed information based on the first information in S302 may include:

The network device determines, based on the first capability and a preset correspondence between different capabilities and different processing time, the processing time corresponding to the first capability; and the network device configures the time domain resource for the to-be-processed information based on the processing time.

The first information in this embodiment of this application includes a capability, that is, the first capability corresponding to the processing time. A correspondence between different capabilities and different processing time is predefined in a protocol. When the first information sent by the terminal device includes the first capability corresponding to the processing time, the network device may search, based on the first capability, the preset correspondence between the different capabilities and the different processing time for processing time that matches the first capability, and then configure the time domain resource for the to-be-processed information based on the matched processing time.

A PUSCH is used as an example, and the first information sent by the terminal device includes a capability, for example, a capability 3, corresponding to PUSCH preparation time. The network device searches a preset correspondence between different capabilities and different PUSCH preparation time for PUSCH preparation time 1 corresponding to the capability 3, and configures a PDCCH time domain resource and a PUSCH time domain resource based on the PUSCH preparation time 1 corresponding to the capability 3, so that a time interval between the last symbol of the PDCCH time domain resource and the first symbol of the PUSCH time domain resource is not less than the PUSCH preparation time 1. That is, in this embodiment of this application, the first capability corresponding to the processing time is carried in the first information, to reduce a data amount of the first information, thereby facilitating transmission of the first information.

In a second example, the first information in this embodiment of this application may alternatively include the processing time. In this case, that the network device configures a time domain resource for the to-be-processed information based on the first information in S302 may include:

The network device configures the time domain resource for the to-be-processed information based on the processing time.

That is, in this embodiment of this application, the first information sent by the terminal device to the network device may include the processing time. The network device configures the time domain resource based on the processing time. This helps adapt the configured time domain resource to the processing time of the terminal device.

In a third example, the first information may include a clock relaxation factor S and a clock relaxation correction parameter C, and that the network device configures a time domain resource for the to-be-processed information based on the first information in S302 may include:

The network device configures the time domain resource for the to-be-processed information based on the clock relaxation factor and the clock relaxation correction parameter.

In this embodiment of this application, the terminal device indirectly reports the processing time of the terminal device in a manner of reporting the clock relaxation factor S and the clock relaxation modifier C.

Optionally, symbol-level processing time, of the terminal device, obtained after a clock is relaxed, meets a formula (2):

$$N_{DVFS}=S*N+C \quad (2)$$

Both $N_{DVFS}$ and N are symbol-level parameters.

Then, the network device calculates processing time $T_{DVFS}$ of the terminal device based on $N_{DVFS}$, and configures a corresponding time domain resource based on $T_{DVFS}$.

Optionally, absolute processing time, of the terminal device, obtained after the clock is relaxed, meets a formula (3):

$$T_{DVFS}=S*T+C \quad (3)$$

Both $T_{DVFS}$ and T are absolute time, and T is calculated based on existing symbol-level processing time N of the terminal device.

Then, the network device configures a corresponding time domain resource based on $T_{DVFS}$.

An absolute value of the foregoing clock relaxation correction parameter C increases as a size of a subcarrier spacing increases.

In some embodiments, the processing time in the embodiments of this application includes N capabilities. As shown in FIG. 2, the PUSCH preparation time includes the capability 1, the capability 2, and the capability 3. In addition, durations of PUSCH preparation time corresponding to different capabilities are different, and power saving statuses corresponding to the different capabilities are also different. In this case, that the network device configures a time domain resource for the to-be-processed information based on the first information in S302 may include:

The network device configures, based on the N capabilities of the processing time, time domain resources corresponding to M capabilities of the N capabilities, where N and M are positive integers greater than or equal to 1, and M is less than or equal to N; and the network device determines, in the time domain resources corresponding to the M capabilities, a time domain resource corresponding to a second capability as the time domain resource configured for the to-be-processed information.

In this embodiment of this application, the terminal device sends all processing time of the N capabilities to the network device. For example, the first information sent by the terminal device may include the N capabilities, or the first information includes the processing time of the N capabilities. The network device configures corresponding time domain resources for processing time of the M capabilities based on the processing time of the N capabilities, to obtain the time domain resources corresponding to the M capabilities. Specifically, a corresponding time domain resource may be configured for processing time of each of the N capabilities, or corresponding time domain resources may be configured for processing time of several capabilities in the N capabilities, or a corresponding time domain resource may be configured for processing time of one capability in the N capabilities.

A PUSCH is used as an example, and the PUSCH preparation time includes a capability 1, a capability 2, and a capability 3. The network device may configure a corresponding PUSCH time domain resource for PUSCH preparation time of the capability 1, configure a corresponding PUSCH time domain resource for PUSCH preparation time of the capability 2, and configure a corresponding PUSCH time domain resource for PUSCH preparation time of the capability 3. Alternatively, the network device configures corresponding PUSCH time domain resources for PUSCH preparation time of two of the three capabilities, for example, configures a corresponding PUSCH time domain resource for PUSCH preparation time of the capability 1, and configures a corresponding PUSCH time domain resource for PUSCH preparation time of the capability 2. Alternatively, the network device configures a corresponding PUSCH time domain resource for PUSCH preparation time of one of the three capabilities, for example, configures a corresponding PUSCH time domain resource for PUSCH preparation time of the capability 3.

Then, the network device determines, in the configured time domain resources corresponding to the foregoing M capabilities, a time domain resource corresponding to one capability (that is, the second capability) as the time domain resource configured for the to-be-processed information. Referring to the foregoing, the PUSCH is used as an example. It is assumed that the network device configures the PUSCH time domain resource corresponding to the capability 1, the PUSCH time domain resource corresponding to the capability 2, and the PUSCH time domain resource corresponding to the capability 3. The network device selects, from the PUSCH time domain resources corresponding to the foregoing three capabilities, the PUSCH time domain resource corresponding to the capability 3 as the time domain resource configured for the to-be-processed information.

That is, in this embodiment of this application, the network device may configure, based on the N capabilities of the processing time, the time domain resources corresponding to the M capabilities, select the time domain resource corresponding to the second capability from the time domain resources, and send the time domain resource to the terminal device, so that the terminal device adjusts the processing time based on the time domain resource corresponding to the second capability. In this case, the network device still stores time domain resources corresponding to M–1 capabilities, and there is a correspondence between the time domain resources corresponding to the M–1 capabilities and processing time of the corresponding capabilities.

In this embodiment of this application, after the network device indicates a time domain resource corresponding to a specific capability, a time domain resource scheduled by the network device remains unchanged until the network device indicates a time domain resource corresponding to a new capability next time.

In an example, when the terminal device needs to adjust the processing time again, the method in this embodiment may include:

The terminal device sends third information to the network device, where the third information is used to indicate processing time corresponding to a third capability, and the third capability is any capability other than the second capability in the N capabilities;

the network device uses a time domain resource that is of the third capability and that corresponds to the processing time of the third capability as the time domain resource configured for the to-be-processed information;

the network device sends fourth information to the terminal device, where the fourth information is used to indicate the time domain resource corresponding to the third capability; and the terminal device adjusts the processing time based on the time domain resource corresponding to the third capability.

Specifically, when needing to adjust the processing time again, the terminal device sends the third information to the network device, where the third information includes processing time of a new capability. The processing time of the new capability may be processing time that the terminal device expects to adjust, for example, processing time of a third capability, where the third capability is any capability other than the current second capability in the N capabilities. After obtaining the processing time of the third capability, the network device searches the stored time domain resources corresponding to the M−1 capabilities for the time domain resource corresponding to the processing time of the third capability. Then, the fourth information is sent to the terminal device, where the fourth information is used to indicate the time domain resource corresponding to the third capability. In this way, the terminal device can re-adjust the current processing time based on the time domain resource corresponding to the third capability.

Optionally, the fourth information may be an RRC message, or MAC CE or physical layer signaling.

In an example, when the network device needs the terminal device to adjust the processing time again, the method in this embodiment may include:

The network device determines, in the time domain resources corresponding to the M capabilities, a time domain resource corresponding to a fourth capability as the time domain resource configured for the to-be-processed information, where the fourth capability is any capability other than the second capability in the M capabilities.

The terminal device re-adjusts the processing time based on the time domain resource corresponding to the fourth capability.

Specifically, when the network device needs the terminal device to adjust the processing time again, the network device selects the time domain resource corresponding to the fourth capability from the time domain resources of the current M−1 capabilities, where the fourth capability is any capability other than the second capability in the M capabilities. Then, fifth information is sent to the terminal device, where the fifth information is used to indicate the time domain resource corresponding to the fourth capability. The terminal device re-adjusts the current processing time based on the time domain resource corresponding to the fourth capability.

Optionally, the fifth information may be an RRC message, or MAC CE or physical layer signaling.

Optionally, processing time of the foregoing different capabilities has priorities, and the priorities may be pre-defined or may be reported by the terminal device. Optionally, the network device may first configure a corresponding time domain resource based on processing time with a higher priority according to the priorities.

The following further describes the technical solutions in the embodiments of this application with reference to specific examples.

Figure 7:
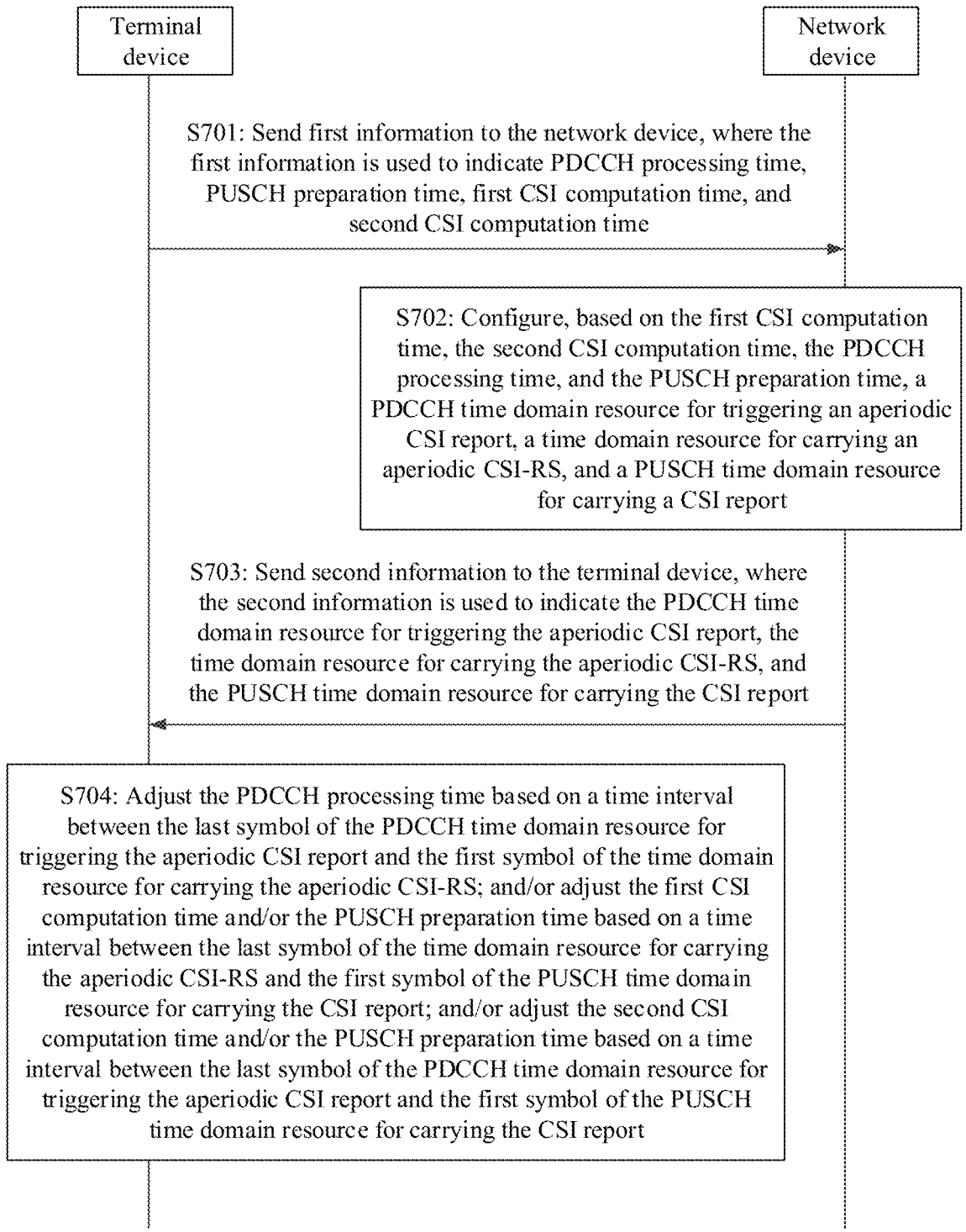
FIG. 7 is a flowchart of a terminal device power saving method according to a second embodiment of this application.

FIG. 7 is a flowchart of a terminal device power saving method according to a second embodiment of this application. To-be-processed information in this embodiment of this application is aperiodic CSI. As shown in FIG. 7, the method in this embodiment of this application may include the following steps.

At S701, a terminal device sends first information to a network device, where the first information is used to indicate PDCCH processing time, PUSCH preparation time, first CSI computation time, and second CSI computation time.

Optionally, the first information may include one or more capabilities of the PDCCH processing time, the PUSCH preparation time, the first CSI computation time, and the second CSI computation time.

Optionally, the first information may include the PDCCH processing time, the PUSCH preparation time, the first CSI computation time, and the second CSI computation time, and all of the foregoing processing time may be processing time corresponding to one capability, or may be processing time corresponding to a plurality of capabilities.

Optionally, the first information may be RRC, MAC CE, or physical layer signaling, or the like. This is not limited in this embodiment of this application.

At S702, the network device configures, based on the first CSI computation time, the second CSI computation time, the PDCCH processing time, and the PUSCH preparation time, a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between the last symbol of the time domain resource for carrying the aperiodic CSI-RS and the first symbol of the PUSCH time domain resource for carrying the CSI report is not less than the PUSCH preparation time and not less than the first CSI computation time, and/or a time interval between the last symbol of the time domain resource for carrying the PDCCH and the first symbol of the PUSCH time domain resource for carrying the CSI report is not less than the second CSI computation time.

Optionally, when the first information includes one capability or first CSI computation time, second CSI computation time, PDCCH processing time, and PUSCH preparation time of one capability, the network device configures, based on the capability or the processing time of the capability, a set of time domain resources including a PDCCH time domain resource for triggering an aperiodic CSI report, a time domain resource for carrying an aperiodic CSI-RS, and a PUSCH time domain resource for carrying a CSI report.

Optionally, when the first information includes a plurality of capabilities or first CSI computation time, second CSI computation time, PDCCH processing time, and PUSCH preparation time of a plurality of capabilities, the network device may configure a set of time domain resources based on processing time of one capability in the plurality of capabilities. Alternatively, the network device may configure one set of time domain resources for processing time of each capability based on the processing time of the plurality of capabilities, that is, configure a plurality of sets of time domain resources, where each set of time domain resources includes a PDCCH time domain resource for triggering an aperiodic CSI report, a time domain resource for carrying an aperiodic CSI-RS, and a PUSCH time domain resource for carrying a CSI report.

Figure 8:
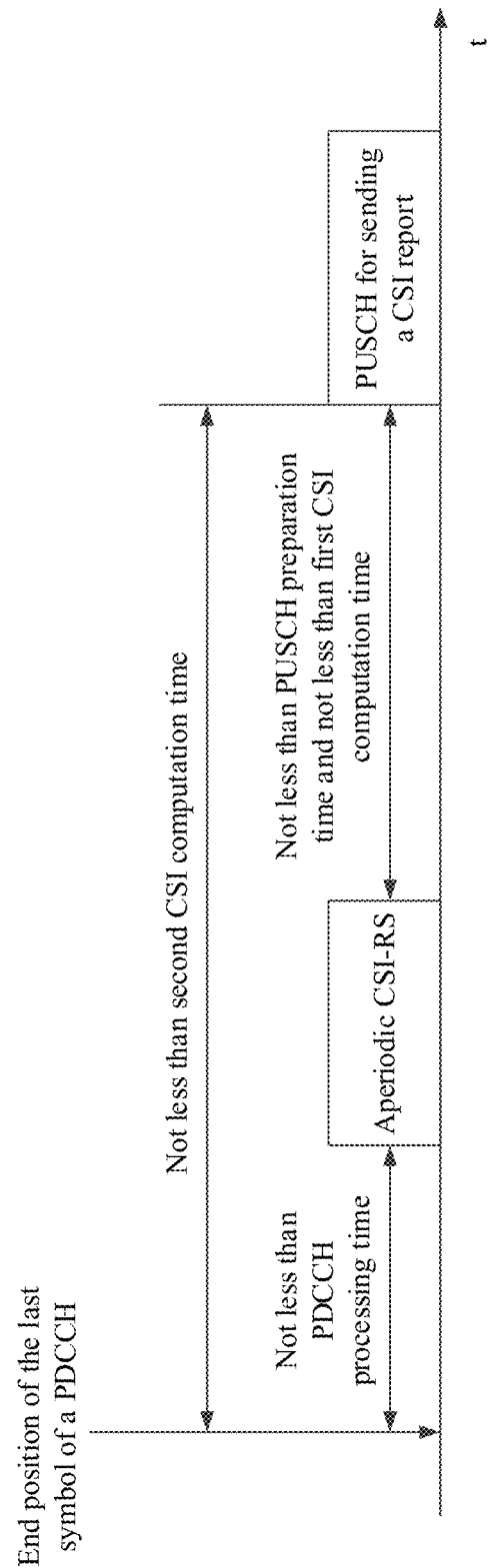
FIG. 8 is a schematic diagram of a relationship among processing time and time domain resources related to aperiodic CSI according to the second embodiment of this application.

As shown in FIG. 8, the foregoing configured time domain resources need to meet the following condition: a time interval between the last symbol of the PDCCH time domain resource for triggering the aperiodic CSI report and the first symbol of the time domain resource for carrying the aperiodic CSI-RS is not less than the PDCCH processing time, and/or a time interval between the last symbol of the time domain resource for carrying the aperiodic CSI-RS and the first symbol of the PUSCH time domain resource for carrying the CSI report is not less than the PUSCH preparation time and not less than the first CSI computation time, and/or a time interval between the last symbol of the time domain resource for carrying the PDCCH and the first symbol of the PUSCH time domain resource for carrying the CSI report is not less than the second CSI computation time.

At S703, the network device sends second information to the terminal device, where the second information is used to indicate the PDCCH time domain resource for triggering the aperiodic CSI report, the time domain resource for carrying the aperiodic CSI-RS, and the PUSCH time domain resource for carrying the CSI report.

Optionally, the second information may be an RRC message, MAC CE or physical layer signaling, or the like. This is not limited in this embodiment of this application.

Optionally, the network device specifies, for the terminal device in the foregoing explicit or implicit configuration manner, a to-be-scheduled time domain resource for carrying an aperiodic CSI-RS and a to-be-scheduled PUSCH time domain resource for carrying a CSI report, and/or a corresponding capability. For a specific process, refer to the foregoing descriptions. Details are not described herein again.

After the network device indicates a current capability and before a specific capability is indicated next time, a time domain resource for carrying an aperiodic CSI-RS and a PUSCH time domain resource for carrying a CSI report that are scheduled by the network device are related to processing time of the current capability.

Optionally, the terminal device may suggest, to the network device through an RRC message, MAC CE or physical layer signaling, or the like, that the network device schedule a time domain resource for carrying an aperiodic CSI-RS and a PUSCH time domain resource for carrying a CSI report that correspond to another capability (a capability other than the current capability). The network device determines whether to enable the foregoing suggestion of the terminal device based on a current status. For a specific process, refer to the descriptions in the foregoing embodiment, and details are not described herein again.

Optionally, the network device may schedule, for the terminal device, through an RRC message, MAC CE or physical layer signaling, or the like, a time domain resource for carrying an aperiodic CSI-RS and a PUSCH time domain resource for carrying a CSI report that correspond to another capability (a capability other than the current capability).

At S704, the terminal device adjusts the PDCCH processing time based on the time interval between the last symbol of the PDCCH time domain resource for triggering the aperiodic CSI report and the first symbol of the time domain resource for carrying the aperiodic CSI-RS; and/or adjusts the first CSI computation time and/or the PUSCH preparation time based on the time interval between the last symbol of the time domain resource for carrying the aperiodic CSI-RS and the first symbol of the PUSCH time domain resource for carrying the CSI report; and/or adjusts the second CSI computation time and/or the PUSCH preparation time based on the time interval between the last symbol of the PDCCH time domain resource for triggering the aperiodic CSI report and the first symbol of the PUSCH time domain resource for carrying the CSI report.

In this embodiment of this application, according to the foregoing steps, the network device configures, for the terminal device, a corresponding PDCCH time domain resource for triggering an aperiodic CSI report, a corresponding time domain resource for carrying an aperiodic CSI-RS, and a corresponding PUSCH time domain resource for carrying a CSI report, so that the terminal device adjusts corresponding processing time based on a corresponding time domain resource, thereby implementing power saving.

Figure 9:
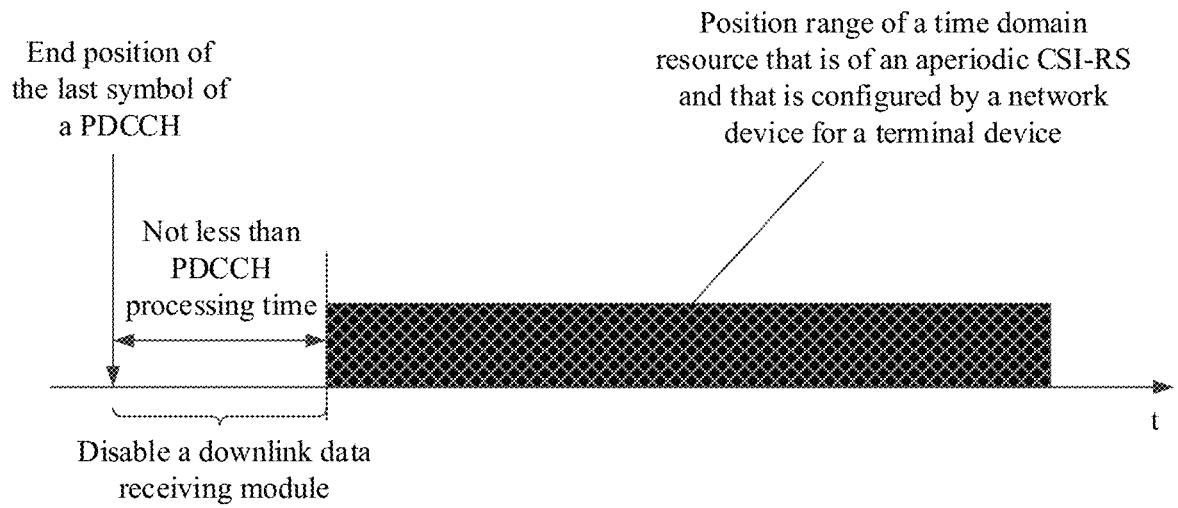
FIG. 9 is a schematic diagram of a position of a CSI-RS time domain resource according to the second embodiment of this application.

Optionally, as shown in FIG. 9, in this embodiment of this application, a downlink data receiving module of the terminal device is disabled within the PDCCH processing time, where the downlink data receiving module includes a front-end receiving unit, such as a radio frequency unit, for receiving downlink data and/or a buffer unit for buffering downlink data.

According to the terminal power saving method provided in this embodiment of this application, when the to-be-processed information is the aperiodic CSI, processing time corresponding to the to-be-processed information includes the PDCCH processing time, the PUSCH preparation time, the first CSI computation time, and the second CSI computation time. The network device configures corresponding time domain resources based on all of the foregoing processing time, so that the time interval between the last symbol of the configured PDCCH time domain resource for triggering the aperiodic CSI report and the first symbol of the time domain resource for carrying the aperiodic CSI-RS is not less than the PDCCH processing time, and/or the time interval between the last symbol of the time domain resource for carrying the aperiodic CSI-RS and the first symbol of the PUSCH time domain resource for carrying the CSI report is not less than the PUSCH preparation time and not less than the first CSI computation time, and/or the time interval between the last symbol of the time domain resource for carrying the PDCCH and the first symbol of the PUSCH time domain resource for carrying the CSI report is not less than the second CSI computation time. Then, the terminal device adjusts corresponding processing time based on the configured time domain resources, to adaptively relax a clock of a corresponding module, thereby implementing power saving.

Figure 10:
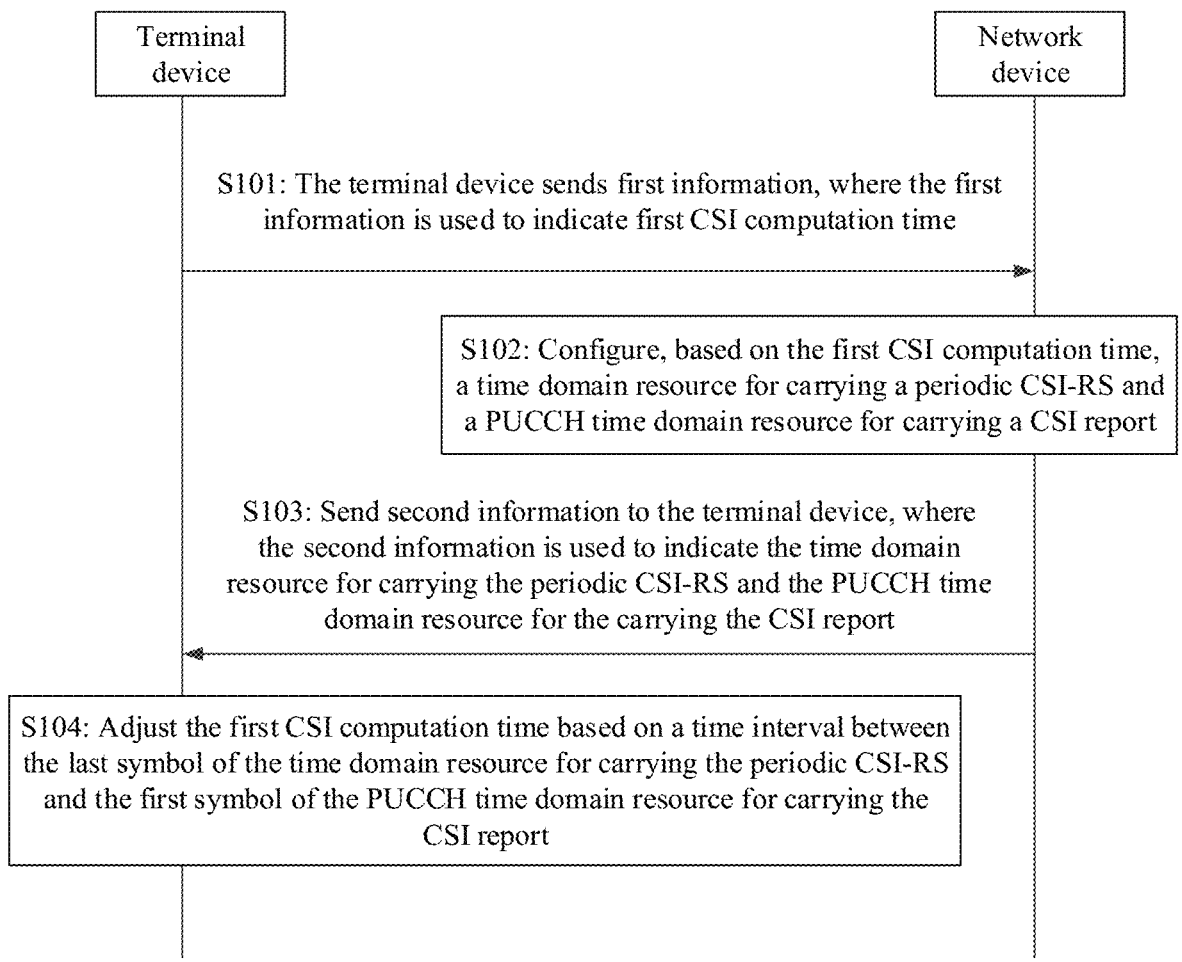
FIG. 10 is a flowchart of a terminal device power saving method according to a third embodiment of this application.

FIG. 10 is a flowchart of a terminal device power saving method according to a third embodiment of this application. When to-be-processed information in this embodiment of this application is aperiodic CSI, as shown in FIG. 10, the method in this embodiment of this application may include the following steps.

At S101, a terminal device sends first information to a network device, where the first information is used to indicate first CSI computation time.

Optionally, the first information may include one or more capabilities of the first CSI computation time.

Optionally, the first information may include first CSI computation time corresponding to one or more capabilities.

Optionally, the first information may be RRC, MAC CE, or physical layer signaling, or the like. This is not limited in this embodiment of this application.

At S102, the network device configures, based on the first CSI computation time, a time domain resource for carrying a periodic CSI-RS and a PUCCH time domain resource for carrying a CSI report.

A time interval between the last symbol of the time domain resource for carrying the periodic CSI-RS and the first symbol of the PUCCH time domain resource for carrying the CSI report is not less than the first CSI computation time.

Optionally, when the first information includes one capability or first CSI computation time of one capability, the network device configures, based on the capability or the first CSI computation time of the capability, a set of time domain resources including a time domain resource for carrying a periodic CSI-RS and a PUCCH time domain resource for carrying a CSI report.

Optionally, when the first information includes a plurality of capabilities or first CSI computation time of a plurality of capabilities, the network device may configure a set of time domain resources based on first CSI computation time of one of the plurality of capabilities. Alternatively, the network device may configure a set of time domain resources for first CSI computation time of each capability based on the first CSI computation time of the plurality of capabilities, to further configure a plurality of sets of time domain resources, where each set of time domain resources includes a time domain resource for carrying a periodic CSI-RS and a PUCCH time domain resource for carrying a CSI report.

Figure 11:
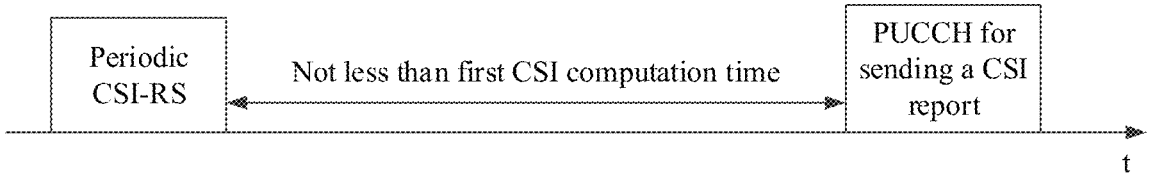
FIG. 11 is a schematic diagram of a relationship among processing time and time domain resources related to periodic CSI according to the third embodiment of this application.

As shown in FIG. 11, the foregoing configured time domain resources need to meet the following condition: a time interval between the last symbol of the time domain resource for carrying the periodic CSI-RS and the first symbol of the PUCCH time domain resource for carrying the CSI report is not less than the first CSI computation time.

At S103, the network device sends second information to the terminal device, where the second information is used to indicate the time domain resource for carrying the periodic CSI-RS and the PUCCH time domain resource for the carrying the CSI report.

Optionally, the second information may be an RRC message, MAC CE or physical layer signaling, or the like. This is not limited in this embodiment of this application.

Optionally, the network device specifies, for the terminal device in an explicit or implicit configuration manner, a time domain resource for carrying a periodic CSI-RS and a PUCCH time domain resource for carrying a CSI report, and/or a corresponding capability. For a specific process, refer to the foregoing descriptions. Details are not described herein again.

After the network device indicates a current capability and before a specific capability is indicated next time, a time domain resource for carrying a periodic CSI-RS and a PUCCH time domain resource for carrying a CSI report that are scheduled by the network device are related to first CSI computation time corresponding to the current capability.

Optionally, the terminal device may suggest, to the network device through an RRC message, MAC CE or physical layer signaling, or the like, that the network device schedule a time domain resource for carrying a periodic CSI-RS and a PUCCH time domain resource for carrying a CSI report that correspond to another capability (a capability other than the current capability). The network device determines whether to enable the foregoing suggestion of the terminal device based on a current status. For a specific process, refer to the descriptions in the foregoing embodiment, and details are not described herein again.

Optionally, the network device may schedule, for the terminal device through an RRC message, MAC CE or physical layer signaling, or the like, a time domain resource for carrying a periodic CSI-RS and a PUCCH time domain resource for carrying a CSI report that correspond to another capability (a capability other than the current capability).

At S104, the terminal device adjusts the first CSI computation time based on the time interval between the last symbol of the time domain resource for carrying the periodic CSI-RS and the first symbol of the PUCCH time domain resource for carrying the CSI report.

In this embodiment of this application, according to the foregoing steps, the network device configures, for the terminal device, a corresponding time domain resource for carrying a periodic CSI-RS and a corresponding PUCCH time domain resource for carrying a CSI report, so that the terminal device adjusts the first CSI computation time based on a corresponding time domain resource, thereby implementing power saving.

According to the terminal power saving method provided in this embodiment of this application, when the to-be-processed information is the periodic CSI, processing time corresponding to the to-be-processed information includes the first CSI computation time. The network device configures, based on the first CSI computation time, the time domain resource for carrying the periodic CSI-RS and the PUCCH time domain resource for carrying the CSI report, so that the time interval between the last symbol of the configured time domain resource for carrying the periodic CSI-RS and the first symbol of the PUCCH time domain resource for carrying the CSI report is not less than the first CSI computation time. Then, the terminal device adjusts the first CSI computation time based on the configured time domain resources, to adaptively relax a clock of a first CSI calculation module, thereby implementing power saving.

Figure 12:
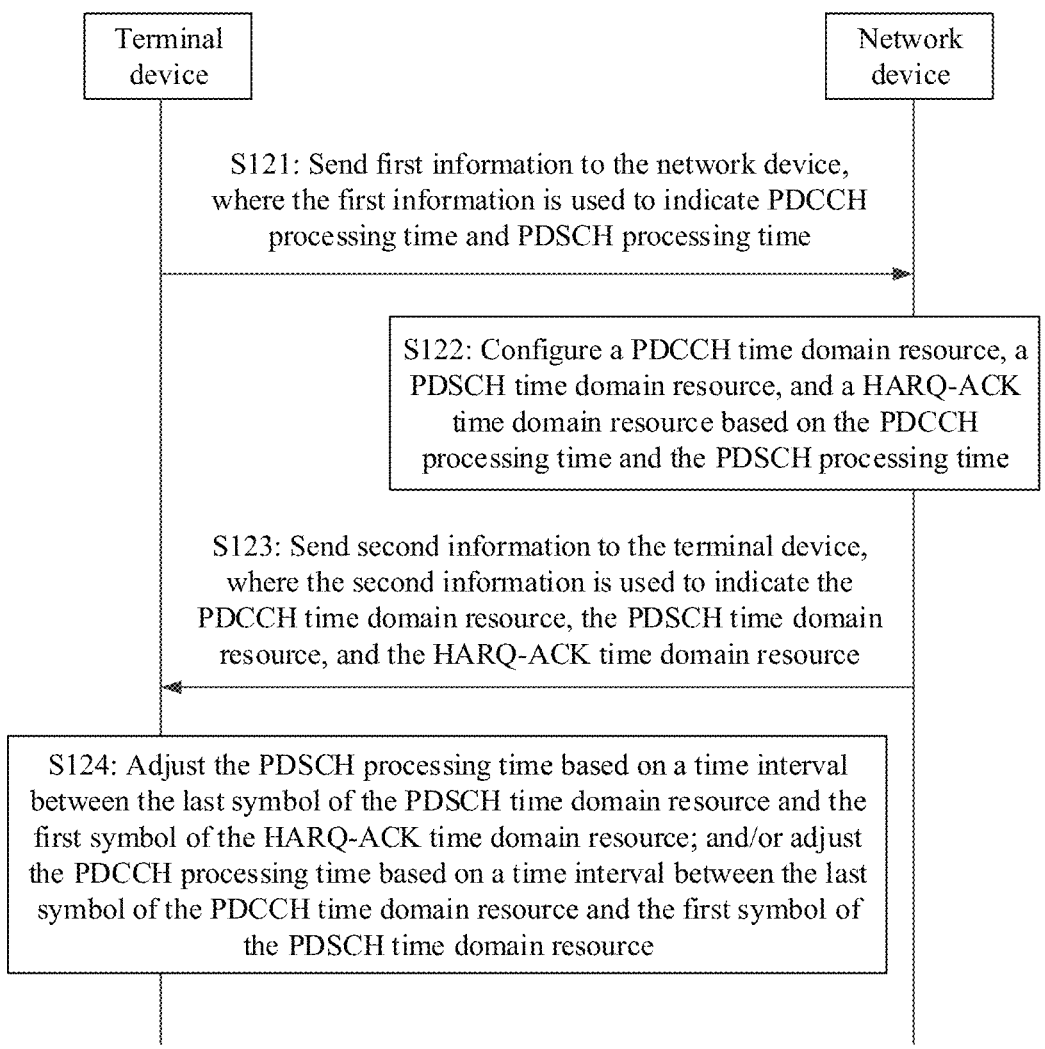
FIG. 12 is a flowchart of a terminal device power saving method according to a fourth embodiment of this application.

FIG. 12 is a flowchart of a terminal device power saving method according to a fourth embodiment of this application. When to-be-processed information in this embodiment of this application is a PDSCH, as shown in FIG. 12, the method in this embodiment of this application may include the following steps.

At S121, a terminal device sends first information to a network device, where the first information is used to indicate PDCCH processing time and PDSCH processing time.

Optionally, the first information may include one or more capabilities of the PDCCH processing time and the PDSCH processing time.

Optionally, the first information may include PDCCH processing time and PDSCH processing time of one or more capabilities.

Optionally, the first information may be RRC, MAC CE, or physical layer signaling, or the like. This is not limited in this embodiment of this application.

At S122, the network device configures a PDCCH time domain resource, a PDSCH time domain resource, and a HARQ-ACK time domain resource based on the PDCCH processing time and the PDSCH processing time.

A time interval between the last symbol of the PDCCH time domain resource and the first symbol of the PDSCH time domain resource is not less than the PDCCH processing time.

Optionally, when the first information includes one capability or PDCCH processing time and PDSCH processing time of one capability, the network device configures, based on the capability or the processing time of the capability, a set of time domain resources including a PDCCH time domain resource, a PDSCH time domain resource, and a HARQ-ACK time domain resource.

Optionally, when the first information includes a plurality of capabilities or first CSI computation time, second CSI computation time, PDCCH processing time, and PUSCH preparation time of a plurality of capabilities, the network device may configure a set of time domain resources based on processing time of one capability in the plurality of capabilities. Alternatively, the network device may configure a set of time domain resources for processing time of each capability based on the processing time of the plurality of capabilities, and further configure a plurality of sets of time domain resources, where each set of time domains includes a PDCCH time domain resource, a PDSCH time domain resources, and a HARQ-ACK time domain resource.

Figure 13:
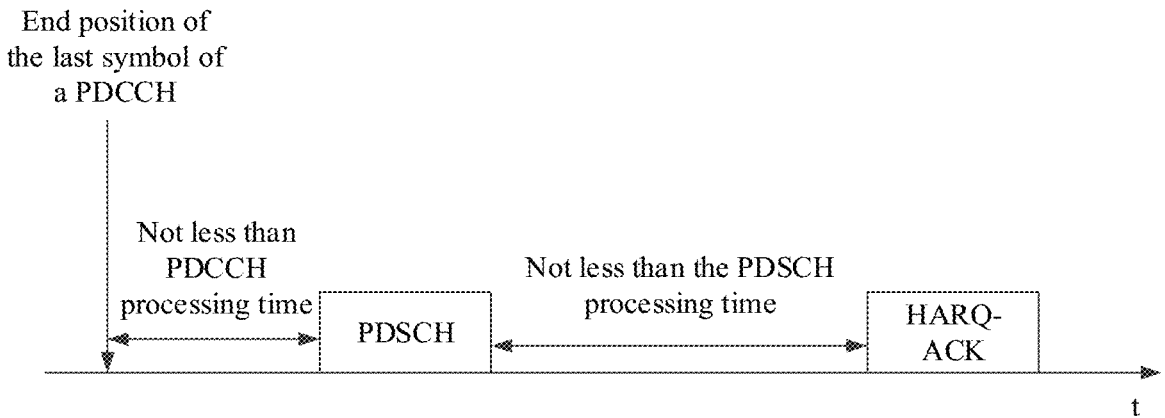
FIG. 13 is a schematic diagram of a relationship among processing time and time domain resources related to a PDSCH according to the fourth embodiment of this application.

As shown in FIG. 13, the foregoing configured time domain resources need to meet the following condition: a time interval between the last symbol of the PDCCH time domain resource and the first symbol of the PDSCH time domain resource is not less than the PDCCH processing time, and/or a time interval between the last symbol of the PDSCH time domain resource and the first symbol of the HARQ-ACK time domain resource is not less than the PDSCH processing time.

At S123, the network device sends second information to the terminal device, where the second information is used to indicate the PDCCH time domain resource, the PDSCH time domain resource, and the HARQ-ACK time domain resource.

Optionally, the second information may be an RRC message, MAC CE or physical layer signaling, or the like. This is not limited in this embodiment of this application.

Optionally, the network device specifies, for the terminal device in an explicit or implicit configuration manner, a to-be-scheduled PDCCH time domain resource, PDSCH time domain resource, and HARQ-ACK time domain resource, and/or a corresponding capability. For a specific process, refer to the foregoing descriptions. Details are not described herein again.

After the network device indicates a current capability and before a specific capability is indicated next time, a PDCCH time domain resource, a PDSCH time domain resource, and a HARQ-ACK time domain resource that are scheduled by the network device are related to processing time corresponding to the current capability.

Optionally, the terminal device may suggest, to the network device through an RRC message, MAC CE or physical layer signaling, or the like, that the network device schedule a PDCCH time domain resource, a PDSCH time domain resource, and a HARQ-ACK time domain resource that correspond to another capability (a capability other than the current capability). The network device determines whether to enable the foregoing suggestion of the terminal device based on a current status. For a specific process, refer to the descriptions in the foregoing embodiment, and details are not described herein again.

Optionally, the network device may schedule, for the terminal device through an RRC message, MAC CE or physical layer signaling, or the like, a PDCCH time domain resource, a PDSCH time domain resource, and a HARQ-ACK time domain resource that correspond to another capability (a capability other than the current capability).

At S124, the terminal device adjusts the PDSCH processing time based on the time interval between the last symbol of the PDSCH time domain resource and the first symbol of the HARQ-ACK time domain resource; and/or adjusts the PDCCH processing time based on the time interval between the last symbol of the PDCCH time domain resource and the first symbol of the PDSCH time domain resource.

In this embodiment of this application, according to the foregoing steps, the network device configures a corresponding PDCCH time domain resource, PDSCH time domain resource, and HARQ-ACK time domain resource for the terminal device, so that the terminal device adjusts corresponding processing time based on the corresponding time domain resources, thereby implementing power saving.

Figure 14:
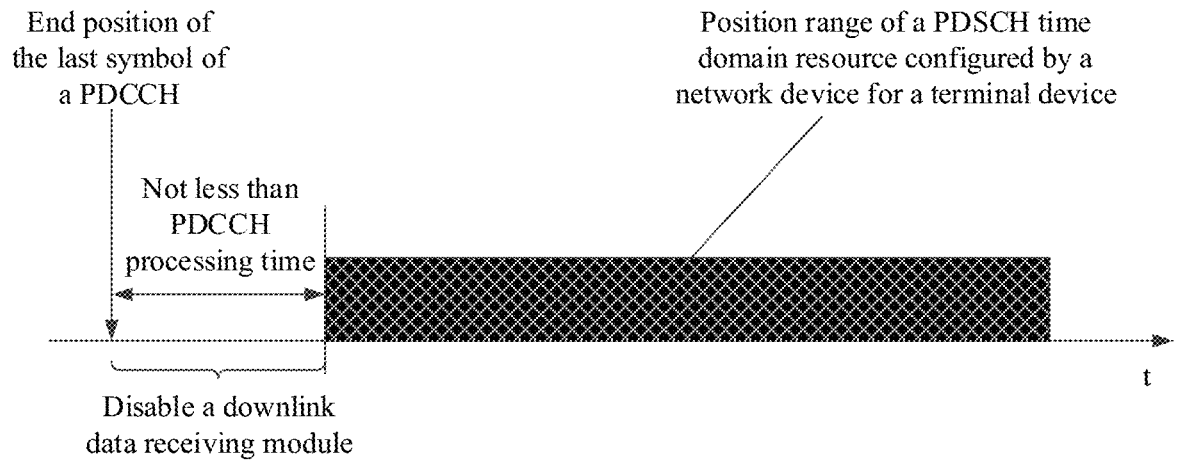
FIG. 14 is a schematic diagram of a position of a PDSCH time domain resource according to the fourth embodiment of this application.

Optionally, as shown in FIG. 14, in this embodiment of this application, a downlink data receiving module of the terminal device is disabled within the PDCCH processing time, where the downlink data receiving module includes a front-end receiving unit, such as a radio frequency unit, for receiving downlink data and/or a buffer unit for buffering downlink data.

According to the terminal power saving method provided in this embodiment of this application, when the to-be-processed information is the PDSCH, processing time corresponding to the to-be-processed information includes the PDCCH processing time and the PDSCH processing time. The network device configures the PDCCH time domain resource, the PDSCH time domain resource, and the HARQ-ACK time domain resource based on the foregoing processing time, so that the time interval between the last symbol of the configured PDCCH time domain resource and the first symbol of the PDSCH time domain resource is not less than the PDCCH processing time, and/or the time interval between the last symbol of the PDSCH time domain resource and the first symbol of the HARQ-ACK time domain resource is not less than the PDSCH processing time. Then, the terminal device adjusts corresponding processing time based on the configured time domain resources, to adaptively relax a clock of a corresponding module, thereby implementing power saving.

Figure 15:
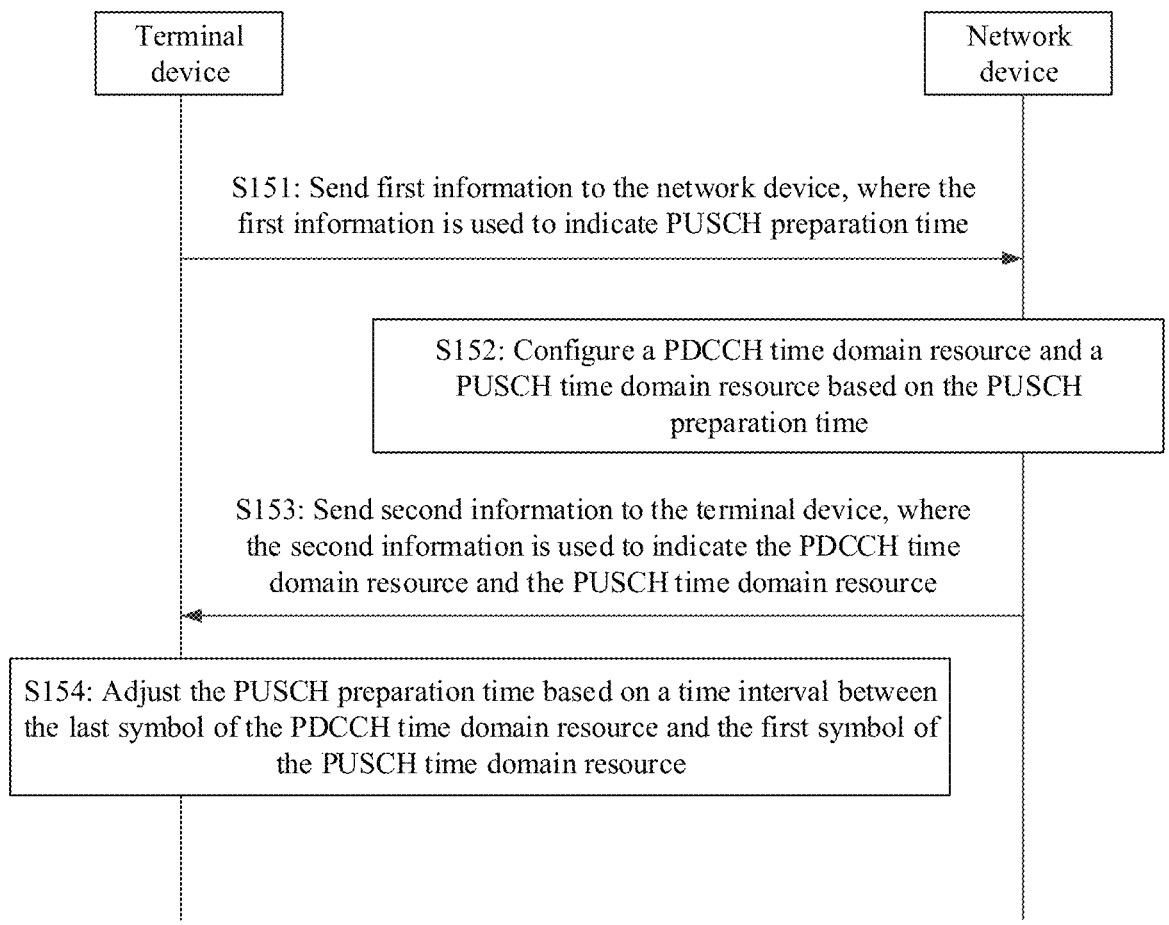
FIG. 15 is a flowchart of a terminal device power saving method according to a fifth embodiment of this application.

FIG. 15 is a flowchart of a terminal device power saving method according to a fifth embodiment of this application. When to-be-processed information in this embodiment of this application is a PUSCH, as shown in FIG. 15, the method in this embodiment of this application may include the following steps.

At S151, a terminal device sends first information to a network device, where the first information is used to indicate PUSCH preparation time.

Optionally, the first information may include one or more capabilities of the PUSCH preparation time.

Optionally, the first information may include PUSCH preparation time corresponding to one or more capabilities.

Optionally, the first information may be RRC, MAC CE, or physical layer signaling, or the like. This is not limited in this embodiment of this application.

At S152, the network device configures a PDCCH time domain resource and a PUSCH time domain resource based on the PUSCH preparation time.

A time interval between the last symbol of the PDCCH time domain resource and the first symbol of the PUSCH time domain resource is not greater than the PUSCH preparation time.

Optionally, when the first information includes one capability or PUSCH preparation time of one capability, the network device configures, based on the capability or the PUSCH preparation time of the capability, a set of time domain resources including a PDCCH time domain resource and a PUSCH time domain resource.

Optionally, when the first information includes a plurality of capabilities or PUSCH preparation time of a plurality of capabilities, the network device may configure a set of time domain resources based on PUSCH preparation time of one capability in the plurality of capabilities. Alternatively, the network device may configure a set of time domain resources for PUSCH preparation time of each capability based on the PUSCH preparation time of the plurality of capabilities, that is, configure a plurality of sets of time domain resources, where each set of time domain resources includes a PDCCH time domain resource and a PUSCH time domain resource.

As shown in FIG. 4, the foregoing configured time domain resources need to meet the following condition: the time interval between the last symbol of the PDCCH time domain resource and the first symbol of the PUSCH time domain resource is not greater than the PUSCH preparation time.

At S153, the network device sends second information to the terminal device, where the second information is used to indicate the PDCCH time domain resource and the PUSCH time domain resource.

Optionally, the second information may be an RRC message, MAC CE or physical layer signaling, or the like. This is not limited in this embodiment of this application.

Optionally, the network device specifies, for the terminal device in an explicit or implicit configuration manner, a to-be-scheduled PDCCH time domain resource and PUSCH time domain resource and a corresponding capability. For a specific process, refer to the foregoing descriptions. Details are not described herein again.

After the network device indicates a current capability and before a specific capability is indicated next time, a PDCCH time domain resource and a PUSCH time domain resource that are scheduled by the network device are related to processing time corresponding to the current capability.

Optionally, the terminal device may suggest, to the network device through an RRC message, MAC CE or physical layer signaling, or the like, that the network device schedule a PDCCH time domain resource and a PUSCH time domain resource that correspond to another capability (a capability other than the current capability). The network device determines whether to enable the foregoing suggestion of the terminal device based on a current status. For a specific process, refer to the descriptions in the foregoing embodiment, and details are not described herein again.

Optionally, the network device may schedule, for the terminal device through an RRC message, MAC CE or physical layer signaling, or the like, a PDCCH time domain resource and a PUSCH time domain resource that correspond to another capability (a capability other than the current capability).

At S154, the terminal device adjusts the PUSCH preparation time based on the time interval between the last symbol of the PDCCH time domain resource and the first symbol of the PUSCH time domain resource.

In this embodiment of this application, according to the foregoing steps, the network device configures a corresponding PDCCH time domain resource and PUSCH time domain resource for the terminal device, so that the terminal device adjusts corresponding PUSCH preparation time based on the corresponding time domain resources, thereby implementing power saving.

According to the terminal power saving method provided in this embodiment of this application, when the to-be-processed information is the PUSCH, processing time corresponding to the to-be-processed information includes the PUSCH preparation time. The network device configures the PDCCH time domain resource and the PUSCH time domain resource based on the foregoing processing time, so that the time interval between the last symbol of the configured PDCCH time domain resource and the first symbol of the PUSCH time domain resource is not greater than the PUSCH preparation time. Then, the terminal device adjusts corresponding processing time based on the configured time domain resources, to adaptively relax a clock of a corresponding module, thereby implementing power saving.

Figure 16:
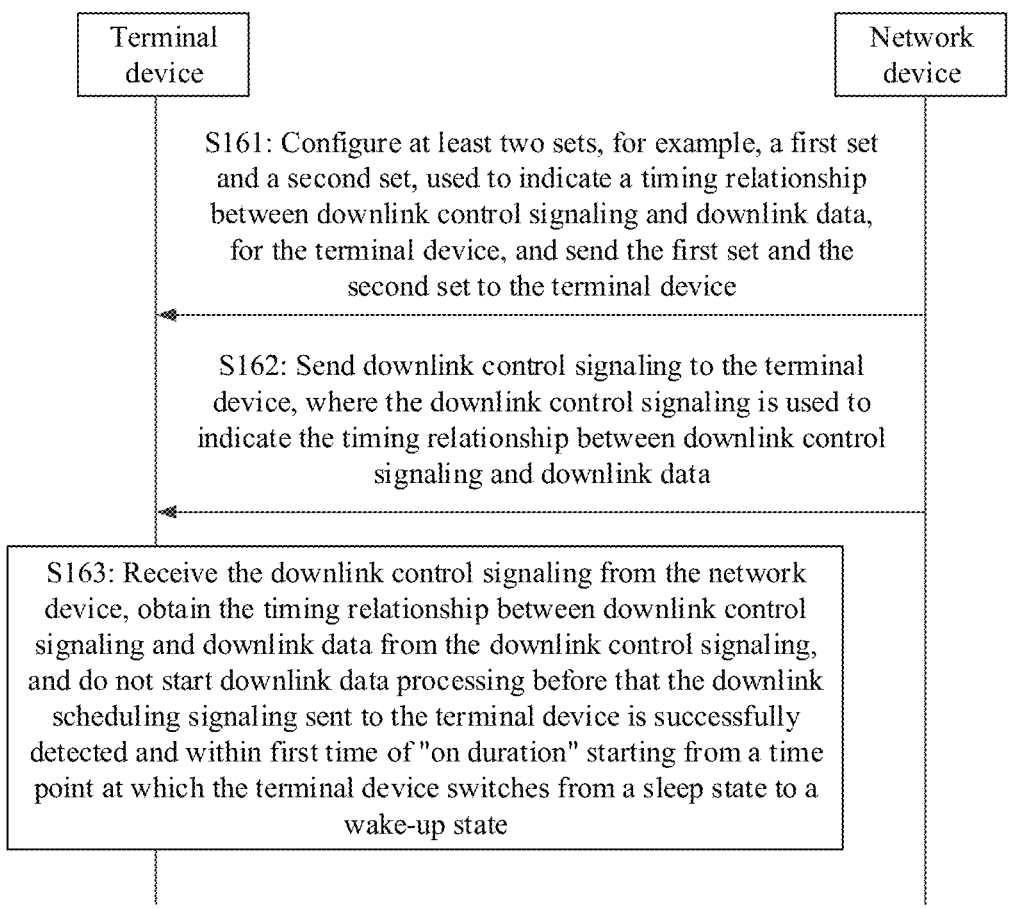
FIG. 16 is a flowchart of a terminal device power saving method according to a sixth embodiment of this application.

FIG. 16 is a flowchart of a terminal device power saving method according to a sixth embodiment of this application. This embodiment relates to time domain resource switching that is based on a scheduling count. As shown in FIG. 16, the method in this embodiment includes the following steps.

At S161, a network device configures at least two sets, for example, a first set and a second set, each used to indicate a timing relationship between downlink control signaling and downlink data, for a terminal device, and sends the first set and the second set to the terminal device.

All elements in the first set are greater than L, and at least one element in the second set is a natural number less than or equal to L.

Optionally, L is zero.

At S162, the network device sends downlink control signaling to the terminal device, where the downlink control signaling is used to indicate the timing relationship between downlink control signaling and downlink data.

Within first time of "on duration" starting from a time point at which the terminal device switches from a sleep state to a wake-up state, an element in the first set is used to indicate the timing relationship between downlink control signaling and downlink data, and within time other than the first time in the wake-up state of the terminal device, an element in the second set is used to indicate the timing relationship between downlink control signaling and downlink data.

The network device sends the timing relationship to the terminal device through the downlink control signaling, and sends a PDCCH and a PDSCH based on the timing relationship.

At S163, the terminal device receives the downlink control signaling from the network device, obtains the timing relationship between downlink control signaling and downlink data from the downlink control signaling, and does not start downlink data processing before successfully detecting the downlink scheduling signaling sent to the terminal device and within the first time of the "on duration" starting from the time point at which the terminal device switches from the sleep state to the wake-up state.

The network device buffers and receives corresponding downlink data when receiving the downlink control signaling within the time other than the first time in the wake-up state of the terminal device.

Further, the terminal device reports a suggested value of L to the network device, where L is determined based on a capability of the terminal device, to be specific, L is determined based on processing time used by the terminal device to detect the PDCCH and processing time used by the terminal device to enable a PDSCH module.

The following uses L=0 as an example to describe a specific implementation method of this application.

The following steps are included on a network device side.

First, the network device configures, for the terminal device through higher layer signaling, a set of values of a parameter used to indicate a timing relationship between PDCCH reception and PDSCH reception. Such timing relationship is specifically described as follows: if the PDCCH is received in an $N^{th}$ slot, the PDSCH is received in an $(N+K0)^{th}$ slot, where K0 is the parameter used to describe the timing relationship between the PDCCH reception and the PDSCH reception. The network device configures a set of values of K0 for the terminal device through the higher layer signaling.

For example, the network device configures at least two sets of values of K0 for the terminal device, where all elements in the first set are greater than 0. For example, the $1^{st}$ K0 set is $\{1, 2, 4, 8\}$, and the $2^{nd}$ K0 set includes 0, where for example, the $2^{nd}$ K0 set is $\{0, 1, 4, 8\}$.

For example, the network device may configure one set of values of K0 for the terminal device. The set includes an element less than or equal to L and an element greater than L. For example, the set is $\{0, 1, 2, 4\}$. Elements that are in the set and that are less than or equal to L are used as the first set, and the set is used as the second set, that is, the first set is a subset of the second set, where for example, the first set is $\{1, 2, 4\}$, and the second set is $\{0, 1, 2, 4\}$.

For example, the network device may configure one set of values of K0 for the terminal device. The set includes an element less than or equal to L and an element greater than L. For example, the set is $\{0, 1, 2, 4\}$ and is used as the second set. A fixed constant, for example, C, is added to each element in the set, to obtain the first set. For example, if C=1, the first set is $\{1, 2, 3, 5\}$. If C=2, the first set is $\{2, 3, 4, 6\}$. The network device may configure the first set and a value of C for the terminal device through higher layer signaling, or the network device configures the first set for the terminal device through higher layer signaling, and a value of C is selected according to a first rule, where the first rule is, for example, that C is a constant known to both the network device and the terminal device.

For example, the network device may configure one set of values of K0 as the second set. There is one element X, for K0, in the first set, that is, the first set is $\{X\}$, where X is greater than or equal to L. A value of X may be configured by the network device for the terminal device by using a higher-layer parameter, or may be a value determined by the network device and the terminal device according to a second rule, where the second rule is, for example, X=L.

For a terminal device that supports multi-carrier aggregation or a multi-link, the network device configures a set of values of K0 for each carrier. To be specific, the network device configures at least two sets of values of K0 for a carrier i, where the carrier i is one of carriers that are of the terminal device and that are configured by the network device.

Next, the network device uses an element in the first set to indicate the timing relationship between downlink control signaling and downlink data within the first time of the "on duration" starting from the time point at which the terminal device switches from the sleep state to the wake-up state. The network device uses an element in the second set to indicate the timing relationship between downlink control signaling and downlink data within the time other than the first time in the wake-up state of the terminal device.

Figure 17:
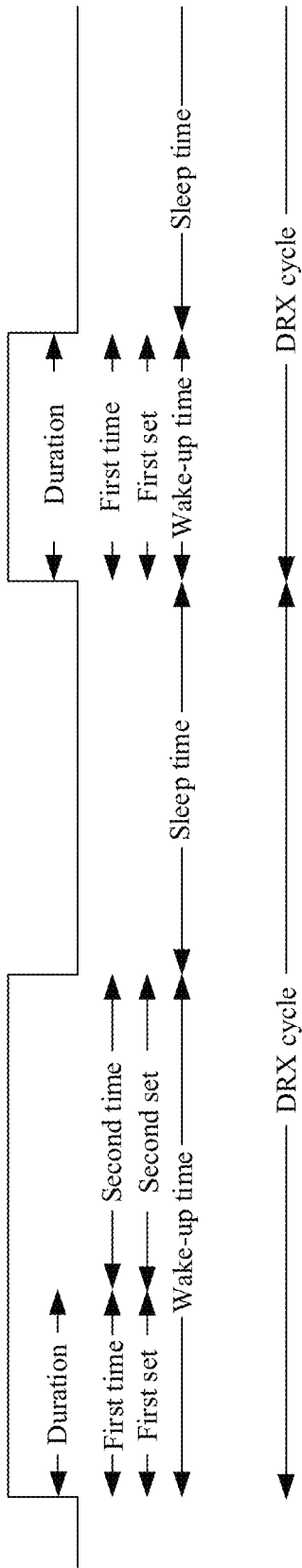
FIG. 17 is a schematic diagram of first time and second time according to the sixth embodiment of this application.

Specifically, as shown in FIG. 17, in a terminal device discontinuous reception (DRX) mode, within first time starting from start time of "on duration" after wake-up, a value of K0 is an element in the first set; within other wake-up time, namely, second time, after the first time, a value of K0 is an element in the second set.

Optionally, a length of the first time is a length of the "on duration". In this way, if the terminal device does not receive scheduling data of the terminal device within an "on duration" monitoring period after the UE is woken up, the terminal device may not need to enable a PDSCH, for example, within second wake-up time shown in FIG. 17, thereby reducing power consumption and saving processing resources.

Optionally, a length of the first time is dynamically variable, and the length of the first time starts from the "on duration" and ends with reception of a $j^{th}$ PDCCH including scheduling information. A value of J may be a fixed value, and for example, J=1, which may also be configured by the network device.

Figure 18:
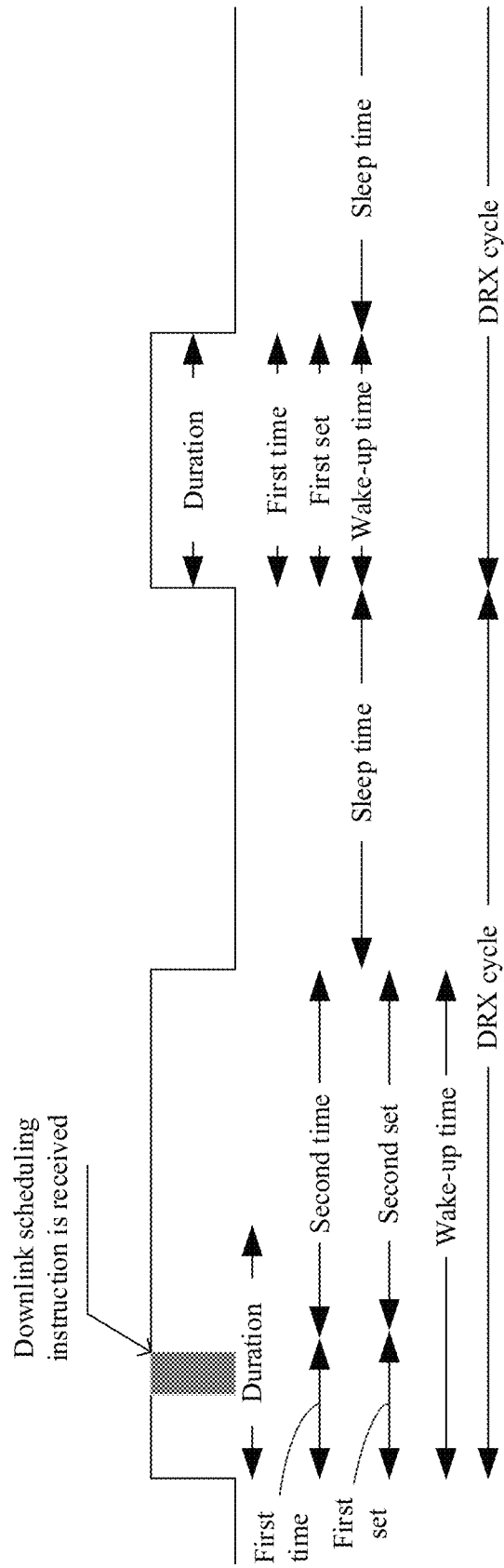
FIG. 18 is another schematic diagram of first time and second time according to the sixth embodiment of this application.

Optionally, as shown in FIG. 18, a length of the first time is dynamically variable, and the length of the first time starts from the "on duration" and ends before PDSCH receiving start time indicated by the first PDCCH including scheduling information.

Then, the network device sends the timing relationship to the terminal device through downlink control signaling, and sends the PDCCH and the PDSCH based on the timing relationship.

If K0 is to be included in the downlink control signaling, the network device determines K0 in the first set or the second set, includes K0 in the downlink control signaling, and sends the downlink control signaling to the terminal device.

A meaning of K0 is: if the downlink control signaling is received in an $N^{th}$ slot, the downlink data is received in the $(N+K0)^{th}$ slot.

The following steps are included on a terminal device side.

The terminal device receives at least two sets, for example, a first set and a second set, configured by the network device for the terminal device and each used to indicate the timing relationship between downlink control signaling and downlink data.

All elements in the first set are greater than L, and at least one element in the second set is a natural number less than or equal to L.

Optionally, L is zero.

The terminal device detects a PDCCH within determined time for detecting the downlink control signaling. Further, the terminal device determines whether current time is the first time. If the current time is the first time, the terminal device does not start downlink data processing before successfully detecting the downlink scheduling signaling sent to the terminal device.

Figure 19:
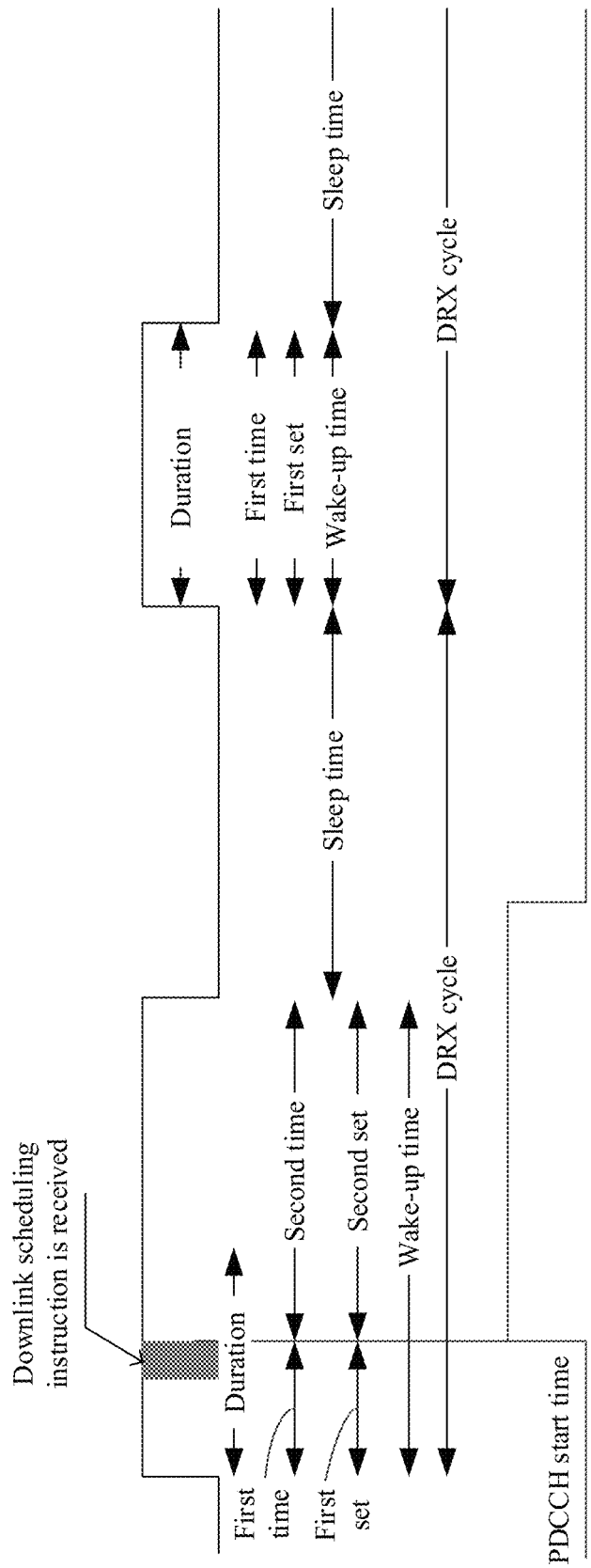
FIG. 19 is a schematic diagram in which a PDSCH is disabled according to the sixth embodiment of this application.

As shown in FIG. 19, a method for determining the first time is as follows: the first time starts as wake-up time of the terminal device starts and ends before the first downlink scheduling grant is received or before PDSCH receiving start time indicated by the first downlink scheduling grant. The terminal device does not enable a PDSCH receiving module before the first time.

According to the method in this embodiment of this application, a longer value of K0 is used in the first time that is after the terminal device is woken up, to reduce unnecessary PDSCH receiving and buffering performed by the terminal device when the terminal device does not know whether there is scheduling information of the terminal device. A smaller value of K0 is used in the second time to implement low-delay scheduling.

Figure 20:
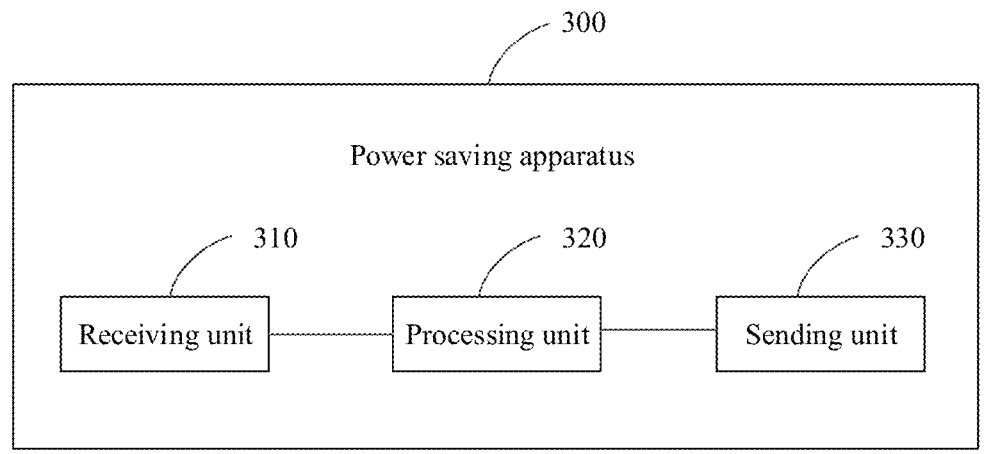
FIG. 20 is a schematic structural diagram of a power saving apparatus according to an embodiment of this application.

FIG. 20 is a schematic structural diagram of a power saving apparatus according to an embodiment of this application. The power saving apparatus may be a network device, or may be a component (for example, an integrated circuit or a chip) of a network device. As shown in FIG. 20, the power saving apparatus 300 may include a receiving unit 310, a processing unit 320, and a sending unit 330.

The receiving unit 310 is configured to receive first information from a terminal device, where the first information is used to indicate processing time for the terminal device to process to-be-processed information.

The processing unit 320 is configured to configure a time domain resource for the to-be-processed information based on the first information.

The sending unit 330 is configured to send second information to the terminal device, where the second information is used to indicate the time domain resource.

The communications apparatus in this embodiment of this application may be configured to perform the technical solutions performed by the network device in the foregoing method embodiments. Implementation principles and technical effects thereof are similar, and details are not described herein again.

In an implementation, the first information includes a first capability corresponding to the processing time. The processing unit 320 is specifically configured to: determine, based on the first capability and a preset correspondence between different capabilities and different processing time, the processing time corresponding to the first capability; and configure a time domain resource for the to-be-processed information based on the processing time.

In another implementation, the processing unit 320 is specifically configured to configure the time domain resource for the to-be-processed information based on the processing time.

In another implementation, the processing time includes N capabilities. The processing unit 320 is specifically configured to: configure, based on the N capabilities of the processing time, time domain resources corresponding to M capabilities of the N capabilities, where N and M are positive integers greater than or equal to 1, and M is less than or equal to N; and determine, in the time domain resources corresponding to the M capabilities, a time domain resource corresponding to a second capability as the time domain resource configured for the to-be-processed information.

In another implementation, the receiving unit 310 is further configured to receive third information from the terminal device, where the third information is used to indicate processing time of a third capability, and the third capability is any capability other than the second capability in the N capabilities.

The processing unit 320 is further configured to use a time domain resource that is of the third capability and that corresponds to the processing time of the third capability as the time domain resource configured for the to-be-processed information.

The sending unit 330 is further configured to send fourth information to the terminal device, where the fourth information is used to indicate the time domain resource corresponding to the third capability.

In another implementation, the processing unit 320 is further configured to determine, in the time domain resources corresponding to the M capabilities, a time domain resource corresponding to a fourth capability as the time domain resource configured for the to-be-processed information, where the fourth capability is any capability other than the second capability in the M capabilities.

The sending unit 330 is further configured to send fifth information to the terminal device, where the fifth information is used to indicate the time domain resource corresponding to the fourth capability.

In another implementation, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

In another implementation, the first information includes a clock relaxation factor and a clock relaxation correction parameter.

The processing unit 320 is configured to configure the time domain resource for the to-be-processed information based on the clock relaxation factor and the clock relaxation correction parameter.

In another implementation, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

In another implementation, when the to-be-processed information is a PDSCH, the processing time includes the PDCCH processing time and the PDSCH processing time.

The processing unit 320 is specifically configured to configure a PDCCH time domain resource, a PDSCH time domain resource, and a hybrid automatic repeat request-acknowledgment (HARQ-ACK) time domain resource based on the PDCCH processing time and the PDSCH processing time.

A time interval between the last symbol of the PDCCH time domain resource and the first symbol of the PDSCH time domain resource is not less than the PDCCH processing time, and/or a time interval between the last symbol of the PDSCH time domain resource and the first symbol of the HARQ-ACK time domain resource is not less than the PDSCH processing time.

In another implementation, when the to-be-processed information is periodic CSI, the processing time includes the first CSI computation time.

The processing unit 320 is specifically configured to configure, based on the first CSI computation time, a time domain resource for carrying a periodic CSI-RS and a PUCCH time domain resource for carrying a CSI report, where a time interval between the last symbol of the time domain resource for carrying the periodic CSI-RS and the first symbol of the PUCCH time domain resource for carrying the CSI report is not less than the first CSI computation time.

In another implementation, when the to-be-processed information is aperiodic CSI, the processing time includes: the PDCCH processing time, the PUSCH preparation time, first CSI computation time, and second CSI computation time.

The processing unit 320 is specifically configured to configure, based on the first CSI computation time, the second CSI computation time, the PDCCH processing time, and the PUSCH preparation time, a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between the last symbol of the time domain resource for carrying the aperiodic CSI-RS and the first symbol of the PUSCH time domain resource for carrying the CSI report is not less than the PUSCH preparation time and not less than the first CSI computation time, and/or a time interval between the last symbol of the time domain resource for carrying the PDCCH and the first symbol of the PUSCH time domain resource for carrying the CSI report is not less than the second CSI computation time.

In another implementation, when the to-be-processed information is carried on PUSCH, the processing time includes the PUSCH preparation time.

The processing unit 320 is specifically configured to configure a PDCCH time domain resource and a PUSCH time domain resource based on the PUSCH preparation time, where a time interval between the last symbol of the PDCCH time domain resource and the first symbol of the PUSCH time domain resource is not less than the PUSCH preparation time.

The communications apparatus in this embodiment of this application may be configured to perform the technical solutions performed by the network device in the foregoing method embodiments. Implementation principles and technical effects thereof are similar, and details are not described herein again.

Figure 21:
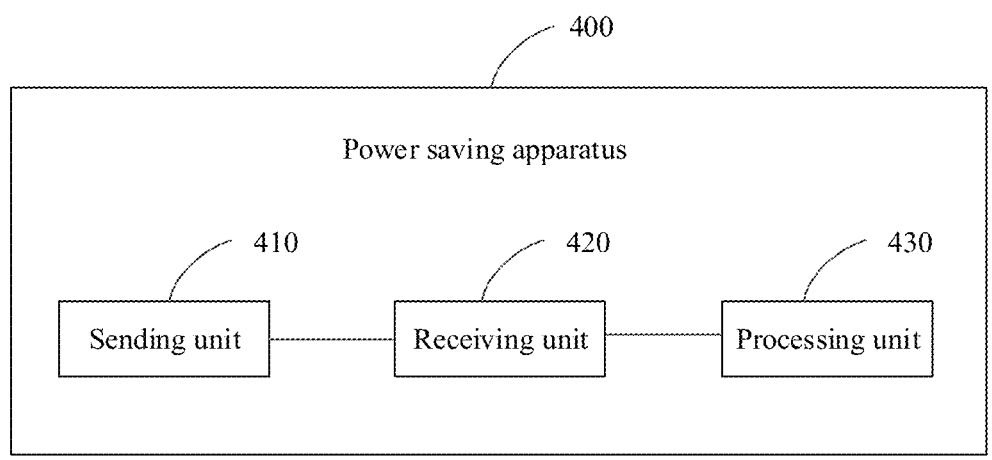
FIG. 21 is a schematic structural diagram of a power saving apparatus according to an embodiment of this application.

FIG. 21 is a schematic structural diagram of a power saving apparatus according to an embodiment of this application. The power saving apparatus may be a terminal device, or may be a component (for example, an integrated circuit or a chip) of a terminal device. As shown in FIG. 21, the power saving apparatus 400 may include a sending unit 410, a receiving unit 420, and a processing unit 430.

The sending unit 410 is configured to send first information to a network device, where the first information is used to indicate processing time for the terminal device to process to-be-processed information.

The receiving unit 420 is configured to receive second information from the network device, where the second information is used to indicate a time domain resource, and the time domain resource is determined based on the first information.

The processing unit 430 is configured to adjust the processing time based on the time domain resource.

The communications apparatus in this embodiment of this application may be configured to perform the technical solutions performed by the terminal device in the foregoing method embodiments. Implementation principles and technical effects thereof are similar, and details are not described herein again.

In an implementation, the first information includes a first capability corresponding to the processing time.

In another implementation, the first information includes the processing time.

In another implementation, the second information includes the time domain resource and/or a capability corresponding to the time domain resource.

In another implementation, the processing time includes N capabilities, the second information is used to indicate that the time domain resource is a time domain resource of a second capability in time domain resources corresponding to M capabilities, and the time domain resources corresponding to the M capabilities are time domain resources configured by the network device for the M capabilities of the N capabilities, where N and M are positive integers greater than or equal to 1, and M is less than or equal to N.

In another implementation, the sending unit 410 is further configured to send third information to the network device, where the third information is used to indicate processing time of a third capability, and the third capability is any capability other than the second capability in the N capabilities.

The receiving unit 420 is further configured to receive fourth information from the network device, where the fourth information is used to indicate a time domain resource corresponding to the third capability.

The processing unit 430 is further configured to adjust the processing time based on the time domain resource corresponding to the third capability.

In another implementation, the receiving unit 420 is further configured to receive fifth information from the network device, where the fifth information is used to indicate a time domain resource corresponding to a fourth capability, and the time domain resource corresponding to the fourth capability is a time domain resource corresponding to any capability other than the second capability in the M capabilities.

The processing unit 430 is further configured to adjust the processing time based on the time domain resource corresponding to the fourth capability.

In another implementation, a time domain resource corresponding to a latter capability of two adjacent capabilities in the M capabilities is included in a time domain resource corresponding to a former capability, or a time domain resource corresponding to a latter capability of two adjacent capabilities in the M capabilities includes a time domain resource corresponding to a former capability.

In another implementation, the first information includes a clock relaxation factor and a clock relaxation correction parameter.

In another implementation, the processing time includes one or more of the following: physical downlink control channel (PDCCH) processing time, physical downlink shared channel (PDSCH) processing time, first channel state information (CSI) computation time, second CSI computation time, and physical uplink shared channel (PUSCH) preparation time.

In another implementation, when the to-be-processed information is a PDSCH, the processing time includes the PDCCH processing time and the PDSCH processing time.

The second information is used to indicate a PDCCH time domain resource, a PDSCH time domain resource, and a hybrid automatic repeat request-acknowledgment (HARQ-ACK) time domain resource.

A time interval between the last symbol of the PDCCH time domain resource and the first symbol of the PDSCH time domain resource is not less than the PDCCH processing time.

In another implementation, the processing unit 430 is specifically configured to: adjust the PDSCH processing time based on the time interval between the last symbol of the PDSCH time domain resource and the first symbol of the HARQ-ACK time domain resource; and/or adjust the PDCCH processing time based on the time interval between the last symbol of the PDCCH time domain resource and the first symbol of the PDSCH time domain resource.

In another implementation, the processing unit 430 is further configured to disable a downlink data receiving module of the terminal device within the PDCCH processing time, where the downlink data receiving module includes a front-end receiving unit, such as a radio frequency unit, for receiving downlink data and/or a buffer unit for buffering downlink data.

In another implementation, when the to-be-processed information is periodic CSI, the processing time includes the first CSI computation time.

The second information is used to indicate a time domain resource for carrying a periodic CSI-RS and a PUCCH time domain resource for carrying a CSI report, and a time interval between the last symbol of the time domain resource for carrying the periodic CSI-RS and the first symbol of the PUCCH time domain resource for carrying the CSI report is not less than the first CSI computation time.

In another implementation, the processing unit 430 is specifically configured to adjust the first CSI computation time based on the time interval between the last symbol of the time domain resource for carrying the periodic CSI-RS and the first symbol of the PUCCH time domain resource for carrying the CSI report.

In another implementation, when the to-be-processed information is aperiodic CSI, the processing time includes: the PDCCH processing time, the PUSCH preparation time, first CSI computation time, and second CSI computation time.

The second information is used to indicate a PDCCH time domain resource for triggering an aperiodic CSI report, a time domain resource for carrying an aperiodic CSI-RS, and a PUSCH time domain resource for carrying a CSI report.

A time interval between the last symbol of the PDCCH time domain resource for triggering the aperiodic CSI report and the first symbol of the time domain resource for carrying the aperiodic CSI-RS is not less than the PDCCH processing time, and/or a time interval between preparation time and not less than the first CSI computation time, and/or a time interval between the last symbol of the time domain resource for carrying the PDCCH and the first symbol of the PUSCH time domain resource for carrying the CSI report is not less than the second CSI computation time.

In another implementation, the processing unit 430 is specifically configured to: adjust the PDCCH processing time based on the time interval between the last symbol of the PDCCH time domain resource for triggering the aperiodic CSI report and the first symbol of the time domain resource for carrying the aperiodic CSI-RS; and/or adjust the first CSI computation time and/or the PUSCH preparation time based on the time interval between the last symbol of the time domain resource for carrying the aperiodic CSI-RS and the first symbol of the PUSCH time domain resource for carrying the CSI report; and/or adjust the second CSI computation time and/or the PUSCH preparation time based on the time interval between the last symbol of the PDCCH time domain resource for triggering the aperiodic CSI report and the first symbol of the PUSCH time domain resource for carrying the CSI report.

In another implementation, the processing unit 430 is further configured to disable a downlink data receiving module of the terminal device within the PDCCH processing time, where the downlink data receiving module includes a front-end receiving unit, such as a radio frequency unit, for receiving downlink data and/or a buffer unit for buffering downlink data.

In another implementation, when the to-be-processed information is a PUSCH, the processing time includes the PUSCH preparation time.

The second information is used to indicate a PDCCH time domain resource and a PUSCH time domain resource, where a time interval between the last symbol of the PDCCH time domain resource and the first symbol of the PUSCH time domain resource is not greater than the PUSCH preparation time.

In another implementation, the processing unit 430 is specifically configured to adjust the PUSCH preparation time based on the time interval between the last symbol of the PDCCH time domain resource and the first symbol of the PUSCH time domain resource.

The communications apparatus in this embodiment of this application may be configured to perform the technical solutions performed by the terminal device in the foregoing method embodiments. Implementation principles and technical effects thereof are similar, and details are not described herein again.

Figure 22:
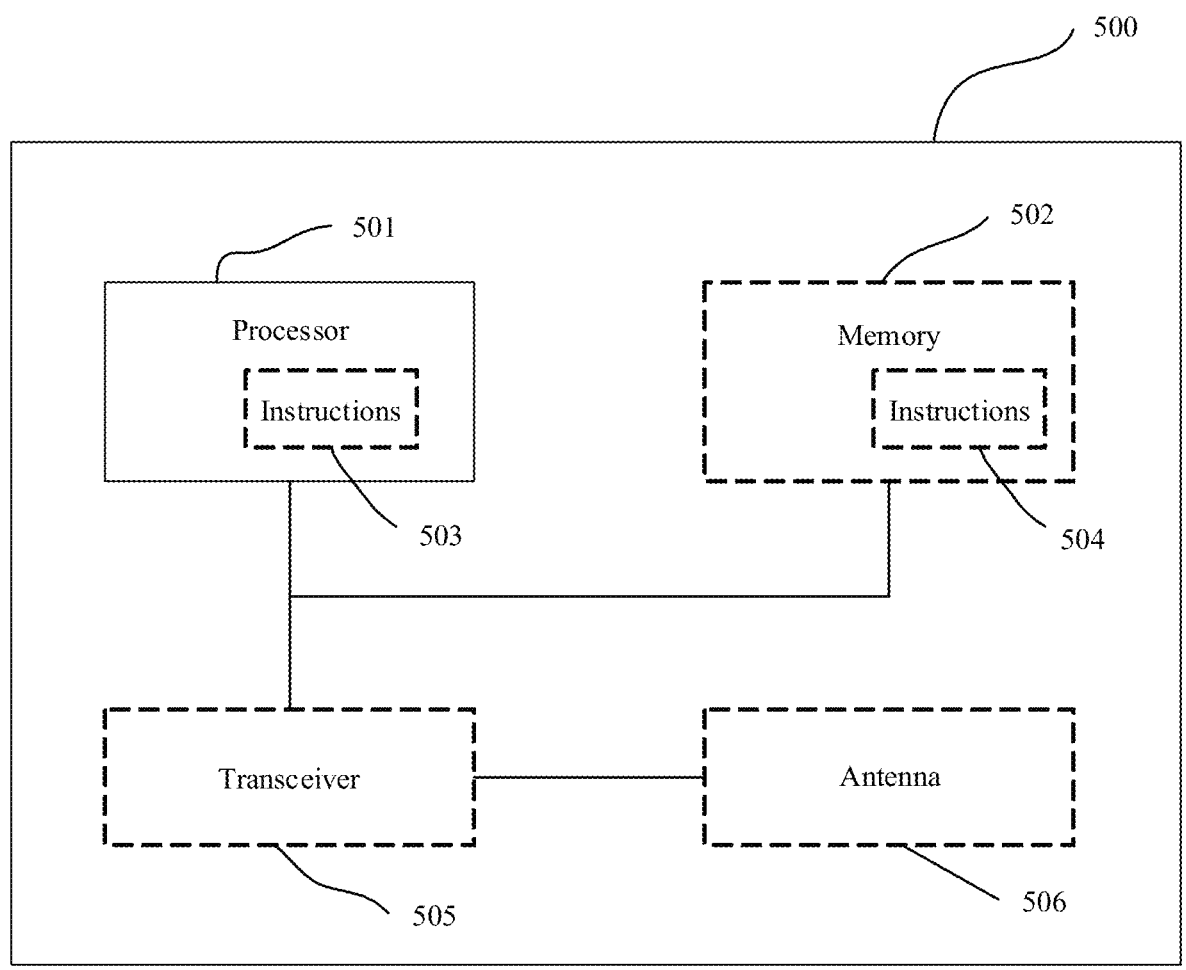
FIG. 22 is a schematic structural diagram of a communications device according to an embodiment of this application.

FIG. 22 is a schematic structural diagram of a communications device according to an embodiment of this application. As shown in FIG. 22, the communications device 500 in this embodiment may be the terminal device (or a component that can be used in the terminal device) or the network device (or a component that can be used in the network device) mentioned in the foregoing method embodiments. The communications device may be configured to implement the method that corresponds to the terminal device or the network device and that is described in the foregoing method embodiments. For details, refer to descriptions in the foregoing method embodiments.

The communications device 500 may include one or more processors 501. The processor 501 may also be referred to as a processing unit, and may implement a specific control or processing function. The processor 501 may be a general-purpose processor, a dedicated processor, or the like. For example, the processor 501 may be a baseband processor or a central processing unit. The baseband processor may be configured to process a communications protocol and communications data. The central processing unit may be configured to control the communications device, execute a software program, and process data of the software program.

In a possible design, the processor 501 may also store instructions 503 or data (for example, intermediate data). The instructions 503 may be run by the processor, so that the communications device 500 performs the method that corresponds to the terminal device or the network device and that is described in the foregoing method embodiments.

In another possible design, the communications device 500 may include a circuit, and the circuit may implement a sending, receiving, or communication function in the foregoing method embodiments.

Optionally, the communications device 500 may include one or more memories 502, where instructions 504 may be stored in the memory 502, and the instructions may be run on the processor, so that the communications device 500 performs the method described in the foregoing method embodiments.

Optionally, the processor and the memory may be disposed separately or may be integrated together.

Optionally, the communications device 500 may further include a transceiver 505 and/or an antenna 506. The processor 501 may be referred to as a processing unit, and controls the communications device (for example, the terminal device or the network device). The transceiver 505 may be referred to as a transceiver unit, a transceiver machine, a transceiver circuit, a transceiver, or the like, and is configured to implement a transceiver function of the communications device.

In a design, the communications device 500 is configured to implement operations corresponding to the network device in the foregoing embodiments. For example, the transceiver 505 may receive first information from the terminal device, where the first information is used to indicate processing time for the terminal device to process to-be-processed information. The processor 501 configures a time domain resource for the to-be-processed information based on the first information. Then, the transceiver 505 sends second information to the terminal device, where the second information is used to indicate the time domain resource.

For specific implementation processes of the transceiver 505 and the processor 501, refer to related descriptions of the network device in the foregoing embodiments. Details are not described herein again.

In another design, the communications device 500 is configured to implement operations corresponding to the terminal device in the foregoing embodiments. For example, the transceiver 505 may send first information to the network device, where the first information is used to indicate processing time for the terminal device to process to-be-processed information. In addition, the transceiver 505 receives second information from the network device, where the second information is used to indicate a time domain resource, and the time domain resource is determined based on the first information. The transceiver 505 adjusts the processing time based on the time domain resource.

For specific implementation processes of the transceiver 505 and the processor 501, refer to related descriptions of the terminal device in the foregoing embodiments. Details are not described herein again.

The processor 501 and the transceiver 505 that are described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an n-channel metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

Although in the descriptions of the foregoing embodiment, the communications device 500 is described by using the terminal device or the network device as an example, the communications device described in this application is not limited to the terminal device or the network device, and a structure of the communications device may not be limited by FIG. 22.

The communications device in this embodiment of this application may be configured to perform the technical solutions performed by the terminal device (or the network device) in the foregoing method embodiments. Implementation principles and technical effects thereof are similar, and details are not described herein again.

Figure 23:
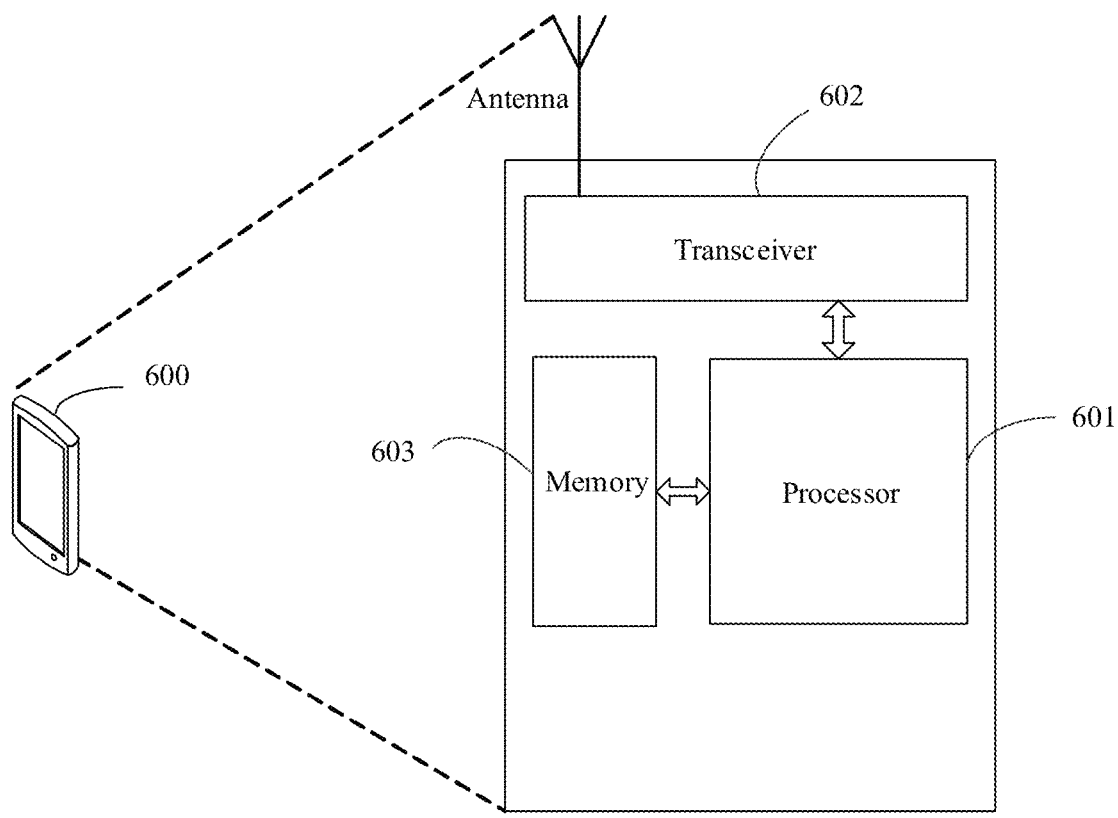
FIG. 23 is a schematic structural diagram of a terminal device according to an embodiment of this application.

FIG. 23 is a schematic structural diagram of a terminal device according to an embodiment of this application. The terminal device 600 may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device 600 includes a processor 601, a transceiver 602, and a memory 603. The processor 601 is configured to support the terminal device 600 in performing corresponding functions in the foregoing methods. The transceiver 602 is configured to support communication between the terminal device 600 and another terminal device or a network device. The terminal device 600 may further include the memory 603. The memory 603 is configured to be coupled to the processor 601, and stores program instructions and data for the terminal device 600.

After the terminal device 600 is powered on, the processor 601 may read the program instructions and the data in the memory 603, interpret and execute the program instructions, and process data of the program instructions. When data needs to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave through an antenna. When data is sent to the terminal, the transceiver 602 receives a radio frequency signal through the antenna, converts the radio frequency signal into a baseband signal, and outputs the baseband signal to the processor 601. The processor 601 converts the baseband signal into data and processes the data.

A person skilled in the art may understand that, for ease of description, FIG. 23 shows only one memory 603 and one processor 601. Actually, the terminal device 600 may include a plurality of processors and a plurality of memories. The memory 603 may also be referred to as a storage medium, a storage device, or the like. This is not limited in this embodiment of this application.

The terminal device in this embodiment of this application may be configured to perform the technical solutions performed by the terminal device in the foregoing method embodiments. Implementation principles and technical effects thereof are similar, and details are not described herein again.

Figure 24:
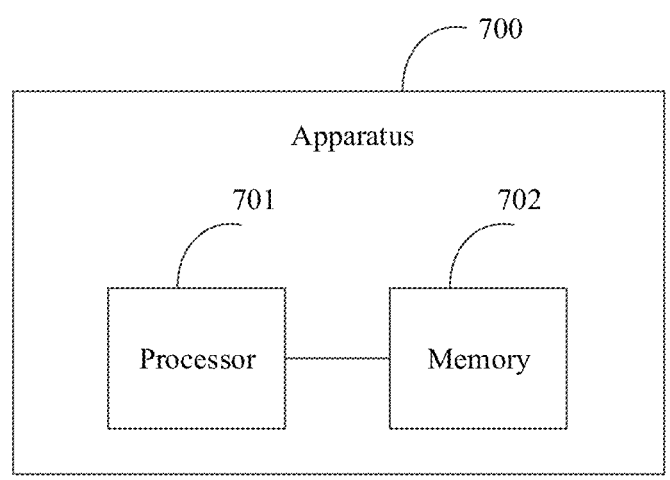
FIG. 24 is a schematic structural diagram of an apparatus according to an embodiment of this application.

FIG. 24 is a schematic structural diagram of an apparatus according to an embodiment of this application. The apparatus 700 exists in a product form of a chip. A structure of the apparatus includes a processor 701 and a memory 702. The memory 702 is configured to be coupled to the processor 701. The memory 702 stores program instructions and data for the apparatus. The processor 701 is configured to execute the program instructions stored in the memory 702, so that the apparatus performs functions of the terminal device in the foregoing method embodiments.

The apparatus in this embodiment of this application may be configured to perform the technical solutions performed by the terminal device in the foregoing method embodiments. Implementation principles and technical effects thereof are similar, and details are not described herein again.

Figure 25:
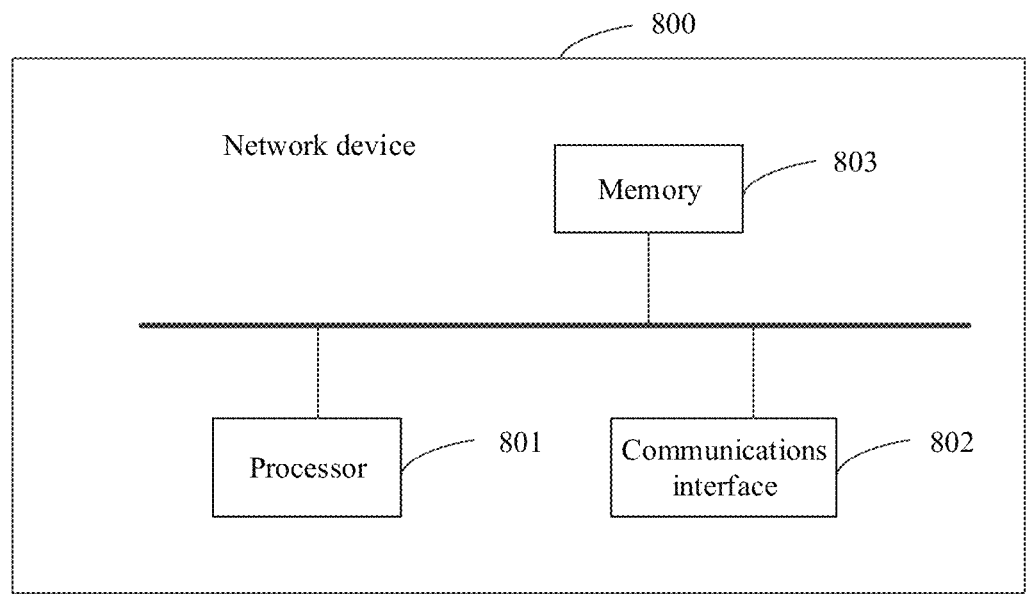
FIG. 25 is a schematic structural diagram of a network device according to an embodiment of this application.

FIG. 25 is a schematic structural diagram of a network device according to an embodiment of this application. The network device 800 may implement functions performed by the network device in the foregoing method embodiments. The functions may be implemented by hardware, or may be implemented by hardware by executing corresponding software. The hardware or software includes one or more modules or units corresponding to the foregoing functions.

In a possible design, a structure of the network device 800 includes a processor 801 and a communications interface 802, and the processor 801 is configured to support the network device 800 in performing corresponding functions in the foregoing methods. The communications interface 802 is configured to support communication between the network device 800 and another network element. The network device 800 may further include a memory 803. The memory 803 is configured to be coupled to the processor 801, and stores program instructions and data for the network device 800.

A person skilled in the art may understand that, for ease of description, FIG. 25 shows only one memory 803 and one processor 801. Actually, the network device 800 may include a plurality of processors and a plurality of memories. The memory 803 may also be referred to as a storage medium, a storage device, or the like. This is not limited in this embodiment of this application.

The network device in this embodiment of this application may be configured to perform the technical solutions performed by the network device in the foregoing method embodiments. Implementation principles and technical effects thereof are similar, and details are not described herein again.

Figure 26:
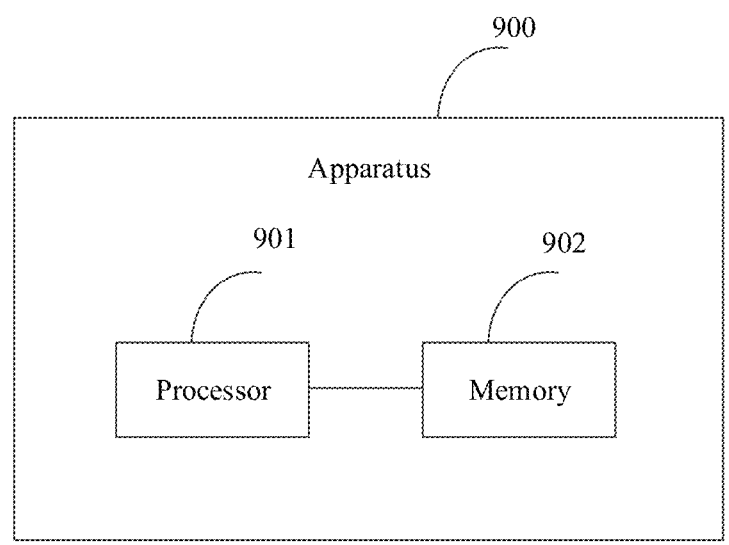
FIG. 26 is a schematic structural diagram of an apparatus according to an embodiment of this application.

FIG. 26 is a schematic structural diagram of an apparatus according to an embodiment of this application. The apparatus 900 exists in a product form of a chip. A structure of the apparatus includes a processor 901 and a memory 902. The memory 902 is configured to be coupled to the processor 901, and the memory 902 stores program instructions and data for the apparatus. The processor 901 is configured to execute the program instructions stored in the memory 902, so that the apparatus performs functions of the network device in the foregoing method embodiments.

The apparatus in this embodiment of this application may be configured to perform the technical solutions performed by the network device in the foregoing method embodiments. Implementation principles and technical effects thereof are similar, and details are not described herein again.

Figure 27:
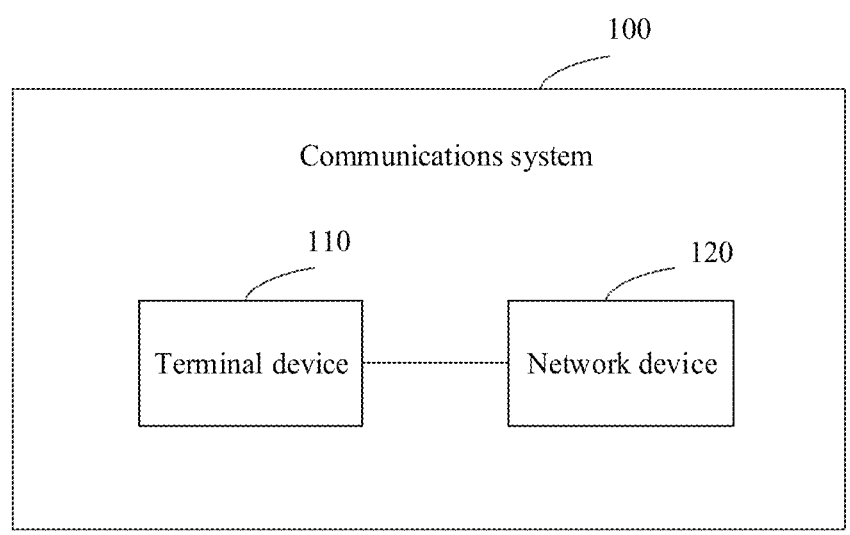
FIG. 27 is a schematic structural diagram of a communications system according to an embodiment of this application.

FIG. 27 is a schematic structural diagram of a communications system according to an embodiment of this application. As shown in FIG. 27, the communications system 100 in this embodiment of this application includes a terminal device 110 and a network device 120 that are described before.

The terminal device 110 may be configured to implement functions of the terminal device in the foregoing method embodiments, and the network device 120 may be configured to implement functions on a network device side in the foregoing method embodiments. Implementation principles and technical effects thereof are similar, and details are not described herein again.

Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, mutual reference may also be made between the method embodiments and between the apparatus embodiments, and same or corresponding content in different embodiments may be cross-referenced. Details are not described herein again.

What is claimed is:

1. A power saving method, the method comprising:
   sending first information to a network device, wherein the first information indicates a processing time for a terminal device to process to-be-processed information;
   receiving second information from the network device, wherein the second information indicates a time domain resource; and
   adjusting the processing time based on the time domain resource;
   wherein the processing time comprises N capabilities, the second information indicates that the time domain resource is a time domain resource of a second capability in time domain resources corresponding to M capabilities, and the time domain resources corresponding to the M capabilities are time domain resources configured by the network device for the M capabilities of the N capabilities, wherein N and M are positive integers greater than or equal to 1, and M is less than or equal to N.

2. The method according to claim 1, wherein the first information comprises the processing time or a first capability corresponding to the processing time.

3. The method according to claim 1, wherein the second information comprises at least one of the time domain resource or a capability corresponding to the time domain resource.

4. The method according to claim 1, wherein the first information comprises a clock relaxation factor and a clock relaxation correction parameter.

5. A power saving apparatus, the apparatus comprising:
   a non-transitory memory storage comprising instructions; and one or more processors in communication with the memory storage, wherein the instructions, when executed by the one or more processors, cause the apparatus to:
receive first information from a terminal device, wherein the first information indicates a processing time for the terminal device to process to-be-processed information;
configure a time domain resource for the to-be-processed information based on the first information; and
send second information to the terminal device, wherein the second information indicates the time domain resource;
wherein the processing time comprises N capabilities, and the configuring the time domain resource for the to-be-processed information based on the first information comprises:
configuring, based on the N capabilities of the processing time, time domain resources corresponding to M capabilities of the N capabilities, wherein N and M are positive integers greater than or equal to 1, and M is less than or equal to N; and
determining, in the time domain resources corresponding to the M capabilities, a time domain resource corresponding to a second capability as the time domain resource configured for the to-be-processed information.

6. The apparatus according to claim 5, wherein the first information comprises the processing time, and the configuring the time domain resource for the to-be-processed information based on the first information comprises:
configuring the time domain resource for the to-be-processed information based on the processing time; or
the first information comprises a first capability corresponding to the processing time, and the configuring the time domain resource for the to-be-processed information based on the first information comprises:
determining, based on the first capability and a preset correspondence between at least one capability and at least one processing time, the processing time corresponding to the first capability; and
configuring the time domain resource for the to-be-processed information based on the processing time corresponding to the first capability.

7. The apparatus according to claim 5, wherein the second information comprises at least one of the time domain resource or a capability corresponding to the time domain resource.

8. The apparatus according to claim 5, wherein the first information comprises a clock relaxation factor and a clock relaxation correction parameter, and the configuring the time domain resource for the to-be-processed information based on the first information comprises:
configuring the time domain resource for the to-be-processed information based on the clock relaxation factor and the clock relaxation correction parameter.

9. A power saving apparatus, the apparatus comprising:
a non-transitory memory storage comprising instructions; and
one or more processors in communication with the memory storage, wherein the instructions, when executed by the one or more processors, cause the apparatus to:
send first information to a network device, wherein the first information indicates a processing time for the terminal device to process to-be-processed information;
receive second information from the network device, wherein the second information indicates a time domain resource, and the time domain resource is determined by the network device based on the first information; and
adjust the processing time based on the time domain resource,
wherein the processing time comprises N capabilities, the second information indicates that the time domain resource is a time domain resource of a second capability in time domain resources corresponding to M capabilities, and the time domain resources corresponding to the M capabilities are time domain resources configured by the network device for the M capabilities of the N capabilities, wherein N and M are positive integers greater than or equal to 1, and M is less than or equal to N.

10. The apparatus according to claim 9, wherein the first information comprises the processing time or a first capability corresponding to the processing time.

11. The apparatus according to claim 9, wherein the second information comprises at least one of the time domain resource or a capability corresponding to the time domain resource.

12. The apparatus according to claim 9, wherein the first information comprises a clock relaxation factor and a clock relaxation correction parameter.

13. The method according to claim 1, wherein a time domain resource corresponding to a latter capability of two adjacent capabilities in the M capabilities is comprised in a time domain resource corresponding to a former capability; or
a time domain resource corresponding to a latter capability of two adjacent capabilities in the M capabilities comprises a time domain resource corresponding to a former capability.

14. The apparatus according to claim 5, wherein a time domain resource corresponding to a latter capability of two adjacent capabilities in the M capabilities is comprised in a time domain resource corresponding to a former capability; or
a time domain resource corresponding to a latter capability of two adjacent capabilities in the M capabilities comprises a time domain resource corresponding to a former capability.

15. The apparatus according to claim 9, wherein a time domain resource corresponding to a latter capability of two adjacent capabilities in the M capabilities is comprised in a time domain resource corresponding to a former capability; or
a time domain resource corresponding to a latter capability of two adjacent capabilities in the M capabilities comprises a time domain resource corresponding to a former capability.

16. A power saving method comprising:
receiving first information from a terminal device, wherein the first information indicates a processing time for the terminal device to process to-be-processed information;
configuring a time domain resource for the to-be-processed information based on the first information; and
sending second information to the terminal device, wherein the second information indicates the time domain resource;

wherein the processing time comprises N capabilities, and the configuring the time domain resource for the to-be-processed information based on the first information comprises:
configuring, based on the N capabilities of the processing time, time domain resources corresponding to M capabilities of the N capabilities, wherein N and M are positive integers greater than or equal to 1, and M is less than or equal to N; and
determining, in the time domain resources corresponding to the M capabilities, a time domain resource corresponding to a second capability as the time domain resource configured for the to-be-processed information.

17. The method according to claim 16, wherein the first information comprises the processing time, and the configuring the time domain resource for the to-be-processed information based on the first information comprises:
configuring the time domain resource for the to-be-processed information based on the processing time; or
the first information comprises a first capability corresponding to the processing time, and the configuring the time domain resource for the to-be-processed information based on the first information comprises:
determining, based on the first capability and a preset correspondence between at least one capabilities and at least one processing time, the processing time corresponding to the first capability; and
configuring the time domain resource for the to-be-processed information based on the processing time corresponding to the first capability.

18. The method according to claim 16, wherein the second information comprises at least one of the time domain resource or a capability corresponding to the time domain resource.

19. The method according to claim 16, wherein a time domain resource corresponding to a latter capability of two adjacent capabilities in the M capabilities is comprised in a time domain resource corresponding to a former capability; or
a time domain resource corresponding to a latter capability of two adjacent capabilities in the M capabilities comprises a time domain resource corresponding to a former capability.

20. The method according to claim 16, wherein the first information comprises a clock relaxation factor and a clock relaxation correction parameter, and the configuring the time domain resource for the to-be-processed information based on the first information comprises:
configuring the time domain resource for the to-be-processed information based on the clock relaxation factor and the clock relaxation correction parameter.

* * * * *